US012379345B2

(12) United States Patent
Beckman et al.

(10) Patent No.: US 12,379,345 B2
(45) Date of Patent: Aug. 5, 2025

(54) METHOD OF PURITY DETERMINATION BY CAPILLARY ELECTROPHORESIS

(71) Applicant: BRISTOL-MYERS SQUIBB COMPANY, Princeton, NJ (US)

(72) Inventors: Jeff W Beckman, Northborough, MA (US); Qian Guan, Newton, MA (US)

(73) Assignee: Bristol-Myers Squibb Company, Princeton, NJ (US)

( * ) Notice: Subject to any disclaimer, the term of this patent is extended or adjusted under 35 U.S.C. 154(b) by 47 days.

(21) Appl. No.: 18/324,079

(22) Filed: May 25, 2023

(65) Prior Publication Data

US 2023/0393094 A1    Dec. 7, 2023

Related U.S. Application Data

(63) Continuation of application No. 16/645,059, filed as application No. PCT/US2018/049992 on Sep. 7, 2018, now Pat. No. 11,698,358.

(60) Provisional application No. 62/555,335, filed on Sep. 7, 2017.

(51) Int. Cl.
G01N 27/447    (2006.01)

(52) U.S. Cl.
CPC ............... G01N 27/44747 (2013.01)

(58) Field of Classification Search
None
See application file for complete search history.

(56) References Cited

U.S. PATENT DOCUMENTS

| 6,579,718 B1 | 6/2003 | Yue | |
| 2006/0160235 A1* | 7/2006 | Craighead | C07K 1/26 436/86 |
| 2009/0132443 A1* | 5/2009 | Mueller | G06N 3/08 706/14 |
| 2009/0314638 A1 | 12/2009 | Liu et al. | |

FOREIGN PATENT DOCUMENTS

| EP | 2865685 A1 | 4/2015 |
| WO | 1993015394 A1 | 8/1993 |
| WO | 2002057737 A2 | 7/2002 |

OTHER PUBLICATIONS

Shaw, Bryan F. et al., "Effect of Surfactant Hydrophobicity on the Pathway for Unfolding of Ubiquitin", Journal of the American Chemical Society, vol. 134, No. 45, Nov. 14, 2012, pp. 18739-18745.

Gudiksen, Katherine L., Differentiation of Proteins Based on Characteristic patterns of association and denaturation in solutions of SDS, Proceedings of the National Academy of Science, May 23, 2006, vol. 103, No. 21, pp. 7968-7972.

Sokolov, Eugene L., et al., "Nanoscale Supramolecular Ordering in Gel-Surfactant Complexes: Sodium Alkyl Sulfates in Poly (dialyldimethylammonium Chloride)." Langmuir 1996, 12, pp. 6229-6234.

* cited by examiner

Primary Examiner — J. Christopher Ball
(74) Attorney, Agent, or Firm — Z. Angela Guo

(57) ABSTRACT

This disclosure provides protein separation techniques using detergents that have alkyl chains longer than 12 carbon atoms, which improves protein separation during electrophoresis.

32 Claims, 22 Drawing Sheets

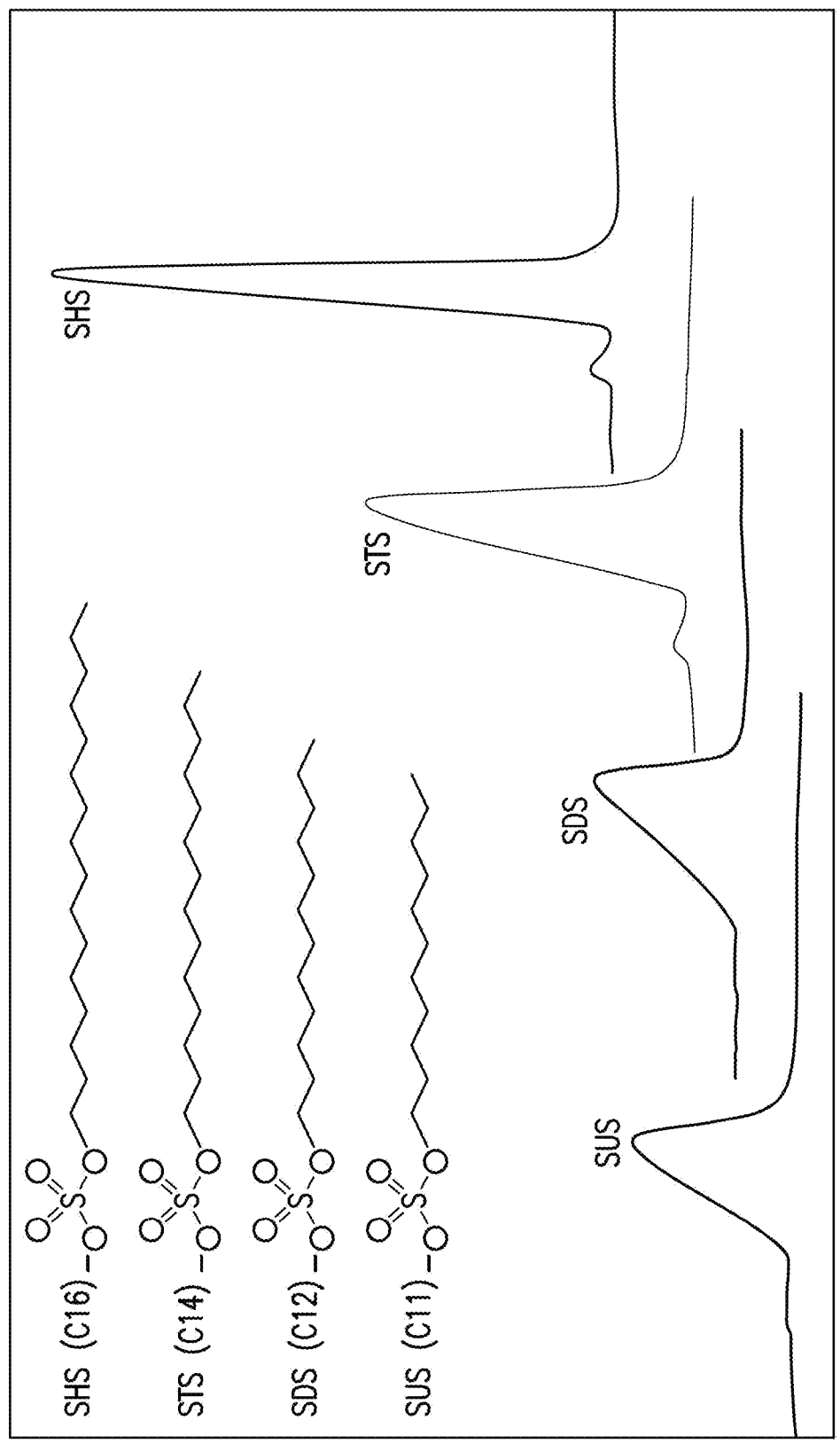

Figure 1A:
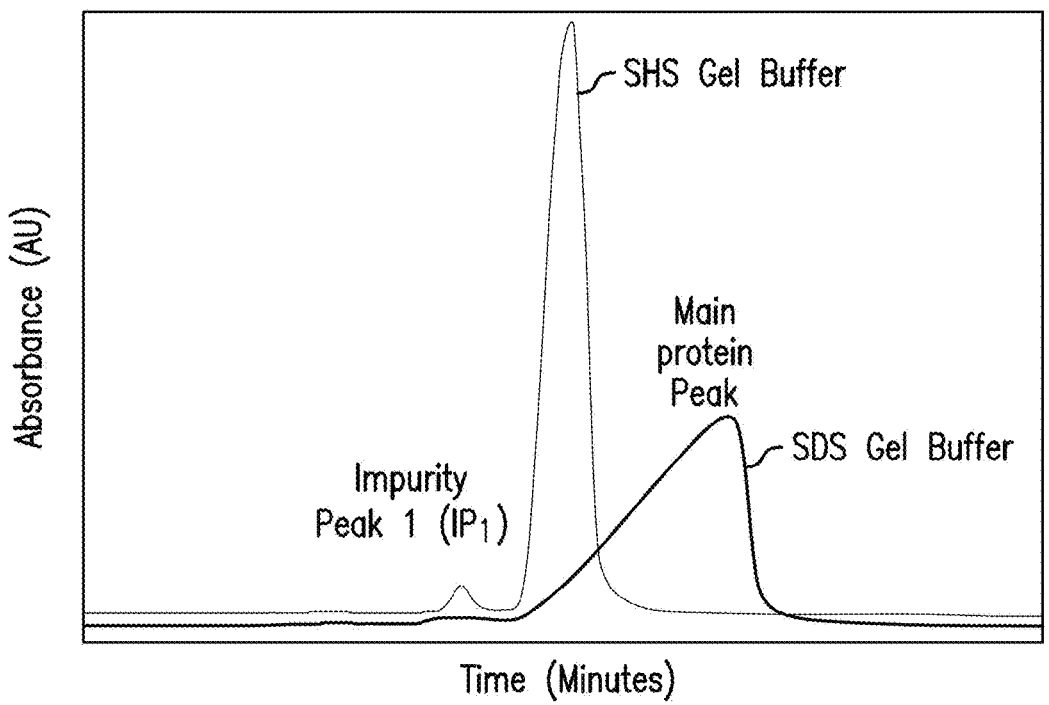

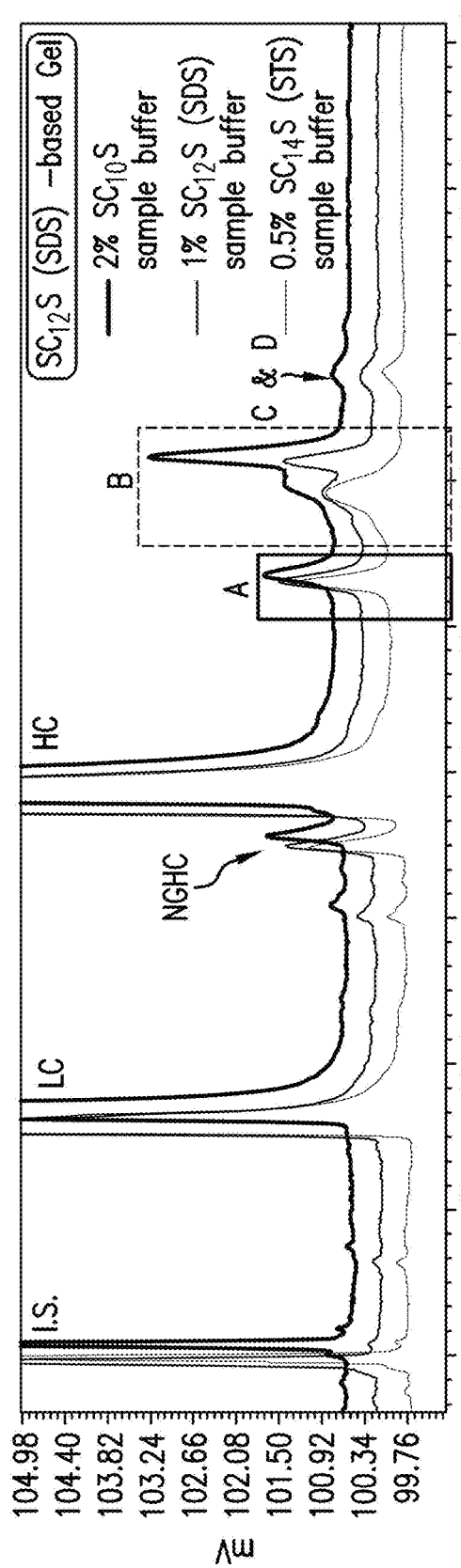
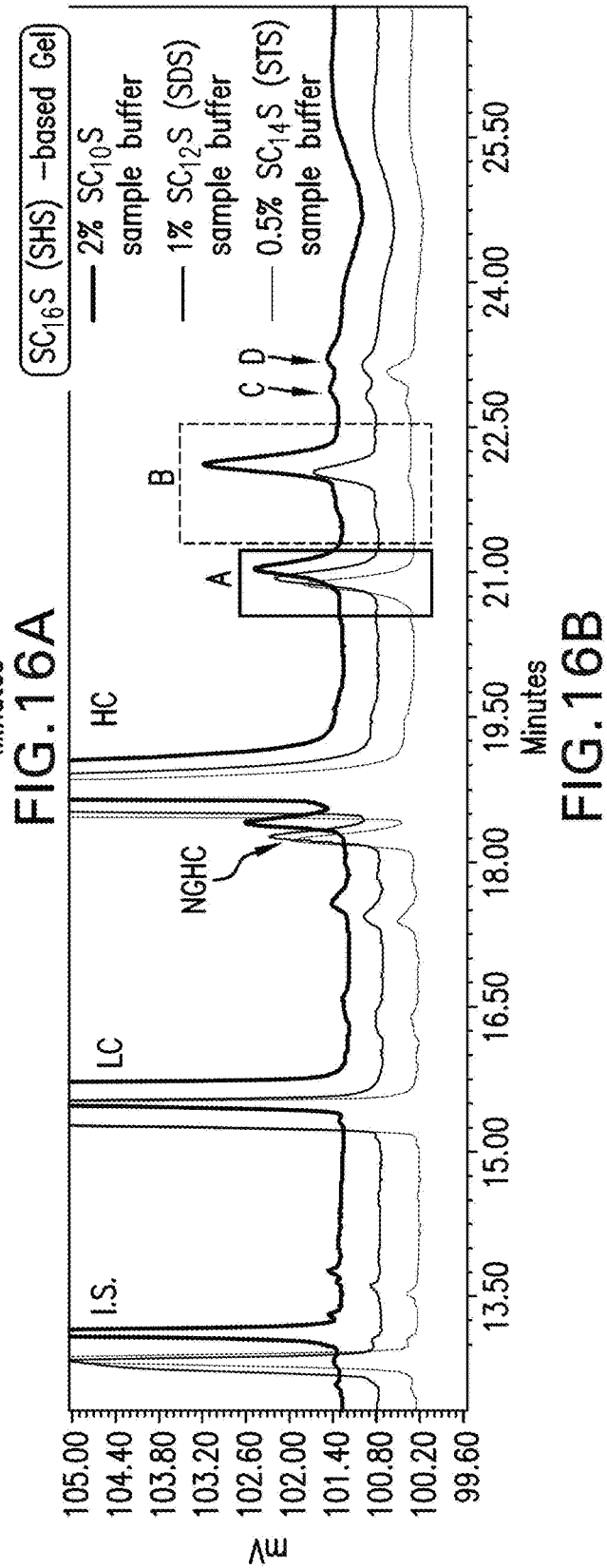
FIG. 16A
FIG. 16B

| | | | | | | | |
|---|---|---|---|---|---|---|---|
| SC$_{10}$S: Sodium Decyl Sulfate–C$_{10}$ | SC$_{12}$S (SDS): Sodium Dodecyl Sulfate–C$_{12}$ | SC$_{13}$S (SDS): Sodium Tridecyl Sulfate–C$_{13}$ | SC$_{14}$S (STS): Sodium Tetradecyl Sulfate–C$_{14}$ | SC$_{15}$S (STS): Sodium Pentadecyl Sulfate–C$_{15}$ | SC$_{16}$S (SHS): Sodium Hexadecyl Sulfate–C$_{16}$ | SC$_{17}$S (SHS): Sodium Heptadecyl Sulfate–C$_{17}$ | SC$_{18}$S (SHS): Sodium Octadecyl Sulfate–C$_{18}$ |

FIG.20

METHOD OF PURITY DETERMINATION BY CAPILLARY ELECTROPHORESIS

CROSS-REFERENCE TO RELATED APPLICATIONS

This application is a continuation of U.S. application Ser. No. 16/645,059, filed Sep. 17, 2018, which is a U.S. 371 filing of PCT/US2018/049992 filed Sep. 7, 2018, which claims the benefit of U.S. Provisional application No. 62/555,335, filed Sep. 7, 2017, the disclosure of which is incorporated herein by reference in its entirety.

FIELD OF THE INVENTION

A method capable of improving protein peak separation efficiency (PSE) by capillary electrophoresis. The method includes increasing detergent hydrophobicity to improve protein separation efficiency (PSE) by increasing the affinity of the detergent to the protein.

BACKGROUND OF THE INVENTION

Throughout this application, various publications are referenced in parentheses by author name and date, or by Patent No. or Patent Publication No. The disclosures of these publications are hereby incorporated in their entireties by reference into this application in order to more fully describe the state of the art as known to those skilled therein as of the date of the disclosure described and claimed herein. However, the citation of a reference herein should not be construed as an acknowledgement that such reference is prior art to the present disclosure.

Commercialization of therapeutic proteins require analytical techniques that can measure product heterogeneity from the complexity of biosynthesis (Chirino, A. J., et.al. (2004) Characterizing Biological Products and Assessing Comparability Following Manufacturing Changes. *Nat Biotechnol.* 22, 1383-1391, 2; Zhao, S., et.al. (2014) Applications of Capillary Electrophoresis in Characteriziong Recombinant Protein Therapeutics. *Electrophoresis* 35, 96-108). Towards this end, Capillary Gel Electrophoresis (CGE) contributes to the understanding of protein size heterogeneity by separating and quantitatively detecting proteins by molecular weight and hydrodynamic radius (Rustandi, R. et.al. (2008) Applications of CE SDS Gel in Development of Biopharmaceutical Antibody-Based Products. *Electrophoresis* 29, 3612-3620-4; Chen, T., et.al. (2016) Antibody-Drug Conjugate Characterization by Chromatographic and Electrophoretic Techniques. *J. Chromatogr. B* 1032, 39-50). In this procedure, the protein is denatured with charged detergent to produce protein-detergent complexes with a uniform mass/charge ratio that is separated by molecular weight while sieving through a capillary filled with a hydrophilic gel buffer solution. This is followed by UV detection ideally at a point along the capillary when quantification of peaks can occur, which requires adequate protein peak separation efficiency (PSE), as defined by high plate counts and resolution. CGE works well for most therapeutic proteins in this regard, specifically for IgGs, and has been accepted as standard for the evaluation of product purity in the biotechnology industry (Nunally, B., et.al. (2006) A Series of Collaborations Between Various Pharmaceutical Companies and Regulatory Authorities Concerning the Analysis of Biomolecules Using Capillary Electrophoresis. *Chromatographia* 64, 359-368).

Sodium dodecyl sulfate (SDS) has been used as the default detergent for CGE separations largely because of its establishment in conventional polyacrylamide gel electrophoresis (SDS-PAGE) (Laemmli, U. K. (1970) Cleavage of Structural Proteins During the Assembly of the Head of Bacteriophage T4. *Nature* 227, 680-685; Otzen, D. E. (2015) Proteins in a Brave New Surfactant World. *Curr. Opin. Colloid Interface Sci.* 20, 161-169). In addition, SDS is able to uniformly bind to a typical protein at a ratio of 1.4 g SDS to 1 g protein, ensuring uniform mass/charge ratios of SDS:Protein complexes in most cases (Reynolds, J. A., et.al. (1970) Binding of Dodecyl Sulfate to Proteins at High Binding Ratios. Possible Implications for the State of Proteins in Biological Membrane. *Proc. Natl. Acad. Sci. USA* 66, 1002-1007). Hence CGE is commonly referred to as SDS-CGE or CE-SDS.

SUMMARY OF THE INVENTION

An embodiment of the invention is a method for analyzing a protein sample, comprising separating denatured protein of interest in the sample by capillary electrophoresis, comprising a hydrophobic detergent gel buffer.

An embodiment of the invention is a method for improving capillary electrophoresis protein peak separation efficiency (PSE), comprising separating denatured protein of interest in the sample in a hydrophobic detergent gel buffer.

An embodiment of the invention is a method for improving protein purity determination by capillary electrophoresis comprising separating denatured protein of interest in the sample in a hydrophobic detergent gel buffer.

Another embodiment of the invention is a method for analyzing a protein sample, comprising separating denatured protein of interest in the sample by capillary electrophoresis, comprising hydrophobic detergent gel buffer, wherein the hydrophobic detergent has the same charged sulfate head group and sodium counter-ion with alkyl chain lengths selected from 11, 14, and 16.

Another embodiment of the invention is a method for improving capillary electrophoresis protein peak separation efficiency (PSE), comprising separating denatured protein of interest in the sample in a hydrophobic detergent gel buffer, wherein the hydrophobic detergent has the same charged sulfate head group and sodium counter-ion with alkyl chain lengths selected from 11, 14, and 16.

Another embodiment of the invention is a method for improving protein purity determination by capillary electrophoresis comprising separating denatured protein of interest in the sample in a hydrophobic detergent gel buffer, wherein the hydrophobic detergent has the same charged sulfate head group and sodium counter-ion with alkyl chain lengths selected from 11, 14, and 16.

Another embodiment of the invention is a method for analyzing a protein sample, comprising separating denatured protein of interest in the sample by capillary electrophoresis, comprising a hydrophobic detergent gel buffer selected from the group consisting of sodium undecyl sulfate (SUS), sodium tetradecyl sulfate (STS), and sodium hexadecyl sulfate (SHS).

Another embodiment of the invention is a method for improving capillary electrophoresis protein peak separation efficiency (PSE), comprising separating denatured protein of interest in the sample in a hydrophobic detergent gel buffer selected from the group consisting of sodium undecyl sulfate (SUS), sodium tetradecyl sulfate (STS), and sodium hexadecyl sulfate (SHS).

Another embodiment of the invention is a method for improving protein purity determination by capillary electrophoresis comprising separating denatured protein of interest in the sample in a hydrophobic detergent gel buffer selected from the group consisting of sodium undecyl sulfate (SUS), sodium tetradecyl sulfate (STS), and sodium hexadecyl sulfate (SHS).

Another embodiment of the invention is a method for analyzing a protein sample, comprising separating denatured protein of interest in the sample by capillary electrophoresis, comprising a sodium hexadecyl sulfate (SHS) gel buffer.

Another embodiment of the invention is a method for improving capillary electrophoresis protein peak separation efficiency (PSE), comprising separating denatured protein of interest in the sample in a sodium hexadecyl sulfate (SHS) gel buffer.

Another embodiment of the invention is a method for improving protein purity determination by capillary electrophoresis comprising separating denatured protein of interest in the sample in a sodium hexadecyl sulfate (SHS) gel buffer.

Another embodiment of the invention is a capillary electrophoresis gel buffer for protein separation analysis that comprises a hydrophobic detergent.

In some embodiments, an electrophoresis buffer composition useful for the present disclosure comprises a hydrophobic detergent comprising a sulfate head group and a hydrophobic tail comprising an alkyl chain having greater than 12 carbon atoms.

In some embodiments, the hydrophobic detergent has an alkyl chain with carbon atoms less than 19 or 20. In some embodiments, the alkyl chain for the hydrophobic detergent has carbon atoms of 13, 14, 15, 16, 17, or 18. In some embodiments, the buffer composition comprises a hydrophobic detergent that is more hydrophobic than sodium dodecyl sulfate.

The present methods can be effective at improving protein peak separation efficiency. In some embodiments, the hydrophobic detergent is capable of inducing improved protein peak separation efficiency by capillary sieving electrophoresis compared to sodium dodecyl sulfate. In other embodiments, the hydrophobic detergent is capable of removing HMW species artifacts.

In some embodiments, the buffer composition comprises a detergent selected from a group consisting of sodium tridecyl sulfate, sodium tetradecyl sulfate (STS), sodium pentadecyl sulfate, sodium hexadecyl sulfate (SHS), sodium heptadecyl sulfate, and sodium octadecyl sulfate (SOS). In some embodiments, the hydrophobic detergent is sodium hexadecyl sulfate (SHS). In some embodiments, the hydrophobic detergent is at a concentration of from about 0.02% to about 4% w/v.

In some embodiments, the buffer composition can further comprise additional components In some embodiments, the buffer composition further comprises one or more additional components selected from a group consisting of a buffering component, an organic additive, a hydrophilic polymer, a metal chelator, and any combination thereof. In some embodiments, the buffering component comprises a tris (hydroxymethyl)aminomethane buffer, a phosphate buffer, a citrate buffer, or any combination thereof. In some embodiments, the organic additive is mannitol, glycerol, ethylene glycol, ethanol, methanol, or any combination thereof. In some embodiments, the hydrophilic polymer is dextran, polyacrylamide, polyethylene glycol, or any combination thereof. In some embodiments, the metal chelator is ethylenediaminetetraacetic acid, diethylenetriaminepentaacetic acid, or any combination thereof.

The present methods are useful for separating a protein of interest via electrophoresis wherein the electrophoresis buffer is added to the sample buffer, the running buffer, and/or the gel itself. In some embodiments, the method for separating a protein of interest via electrophoresis comprises denaturing the protein of interest in a sample buffer. In some embodiments, the method further comprises running an electrophoresis gel in a running buffer. In some embodiments, the running buffer and/or the electrophoresis gel comprise the electrophoresis buffer composition.

The present methods are useful for improving the protein peak separation efficiency (PSE) as compared to the protein peak separation efficiency (PSE) of a separation conducted using sodium dodecyl sulfate (SDS). In some embodiments, the method for improving peak separation efficiency of a protein of interest via electrophoresis comprises denaturing the protein of interest in a sample buffer and/or running a sample in a running buffer electrophoretically, wherein the protein peak separation efficiency (PSE) is improved as compared to the protein peak separation efficiency (PSE) of a separation conducted using sodium dodecyl sulfate (SDS). In some embodiments, the electrophoresis is capillary gel electrophoresis. In some embodiments, the electrophoresis gel results show less artificial high molecular weight species compared to an electrophoresis gel conducted with sodium dodecyl sulfate.

In some embodiments, the denaturing is performed at a temperature of at least about 60° C., at least about 65° C., at least about 70° C., at least about 75° C., or at least about 80° C. In some embodiments, the denaturing is performed at a temperature between about ° C. and about 70° C., between about 65° C. and about 70° C., or about 60° C. and about 65° C. In some embodiments, the denaturing is performed for at least about 3 minutes, at least about 4 minutes, at least about 5 minutes, at least about 6 minutes, at least about 7 minutes, at least about 8 minutes, at least about 9 minutes, at least about 10 minutes.

In some embodiments, the protein of interest is an antibody. In some embodiments, the antibody is an isotype selected from IgM, IgA, IgE, IgD, and IgG. In some embodiments, the IgG antibody is selected from IgG1, IgG2, IgG3, and IgG4. In some embodiments, the protein of interest comprises an enzyme, a hormone, a cytokine, a cell surface receptor, a protease, a cytokine receptor, or any combination thereof. In some embodiments, the protein of interest is a fusion protein. In some embodiments, the fusion protein is fused to a heterologous moiety. In some embodiments, the heterologous moiety is a half-life extending moiety. In some embodiments, the half-life extending moiety comprises an Fc.

DESCRIPTION OF THE DRAWINGS/FIGURES

Figure 1B:
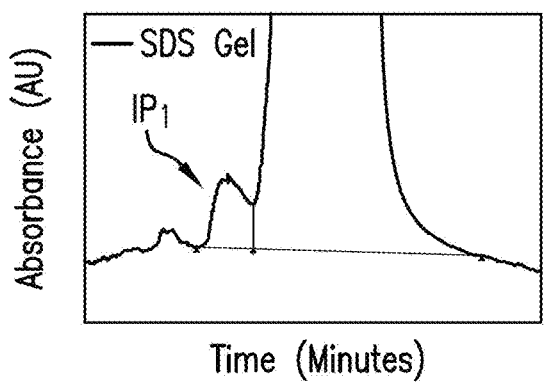
Figure 1C:
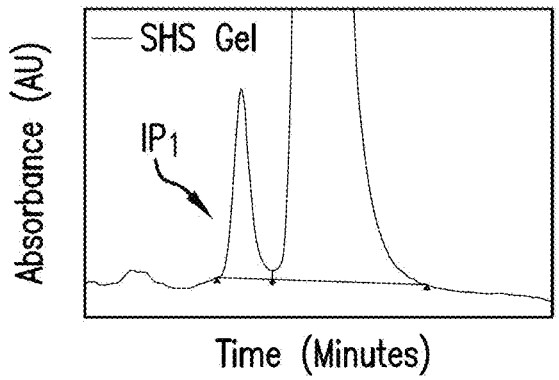

FIG. 1A-1C shows capillary gel electrophoresis (CGE) Electropherograms of recombinant therapeutic protein-1 (RTP-1) comparing results with or without 0.2% sodium hexadecyl sulfate (SHS) added to the gel buffer solution. Images were cropped to show only the regions of interest. FIG. 1A shows the high level overlay showing the relative differences in peak separation efficiency (PSE) between SDS and SHS gel buffer. The baseline zoomed-in view highlighting the impact or SDS gel (FIG. 1B) and SHS gel (FIG. 1C) on Impurity Peak 1 (IP1) resolution from the main RTP-1 peak.

Figure 2A:
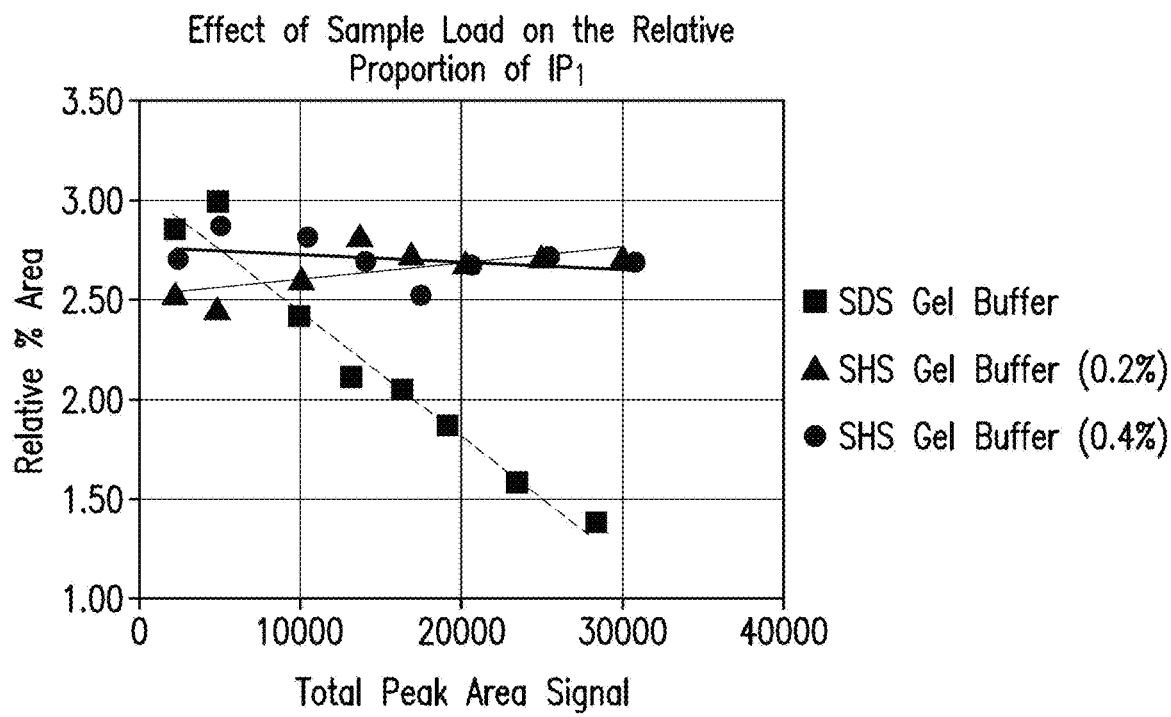
Figure 2B:
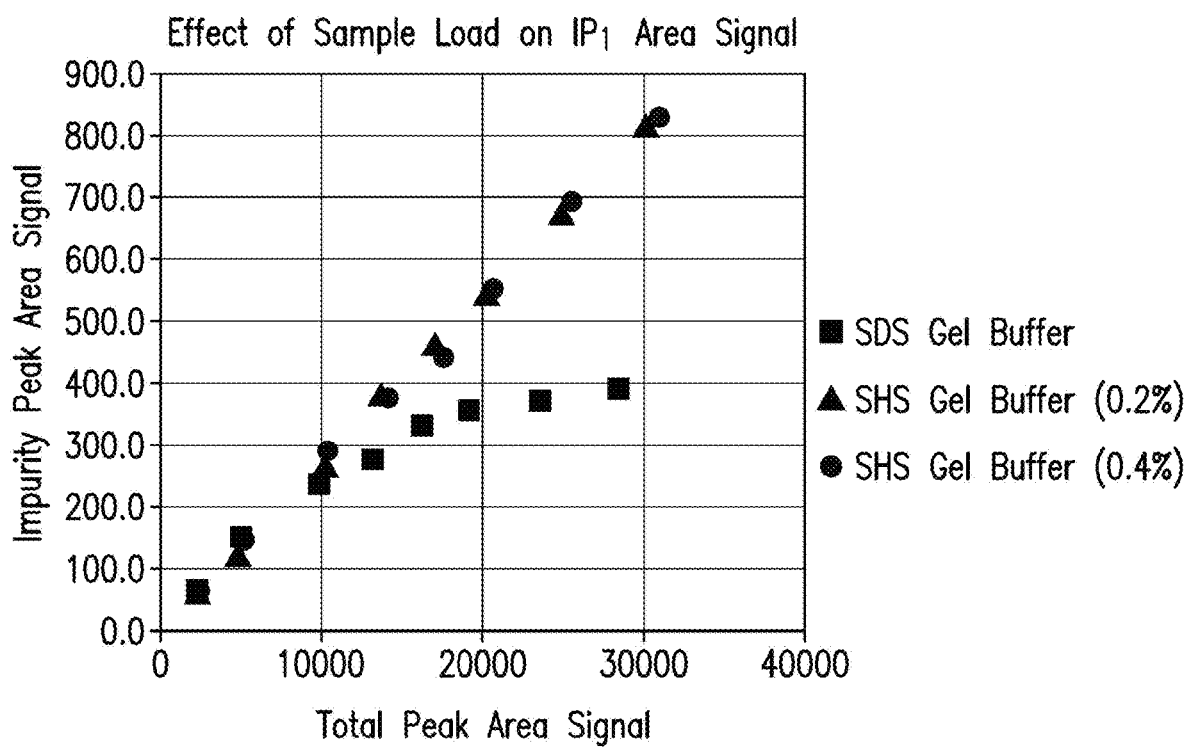

FIGS. 2A and 2B show the impact of SHS on the RTP-1 purity method range (linearity). FIG. 2A shows apparent relative proportion of $IP_1$ present with SDS, 0.2% SHS, or 0.4% SHS in the sieving gel buffer solution. FIG. 2B shows $IP_1$ area signal linearity comparison with SDS, 0.2% SHS, or 0.4% SHS. Note the consistency across the tested concentration range with SHS present. Combined, the data show that without SHS the assay range was limited to peak area signals≤10 k relative to ≥30 k when SHS was used.

FIG. 3 shows electropherograms showing the impact of various detergents on RTP-1 PSE (narrowed into the relevant region with a slight offset). Inset: Structures of the detergents added to the gel buffer solutions. The injected RTP-1 sample and gel buffer contained only the detergent noted above the electropherogram. The impact of gel buffer detergent composition on main peak plate count and resolution between the main peak and $IP_1$ are listed in Table 1.

Figure 4:
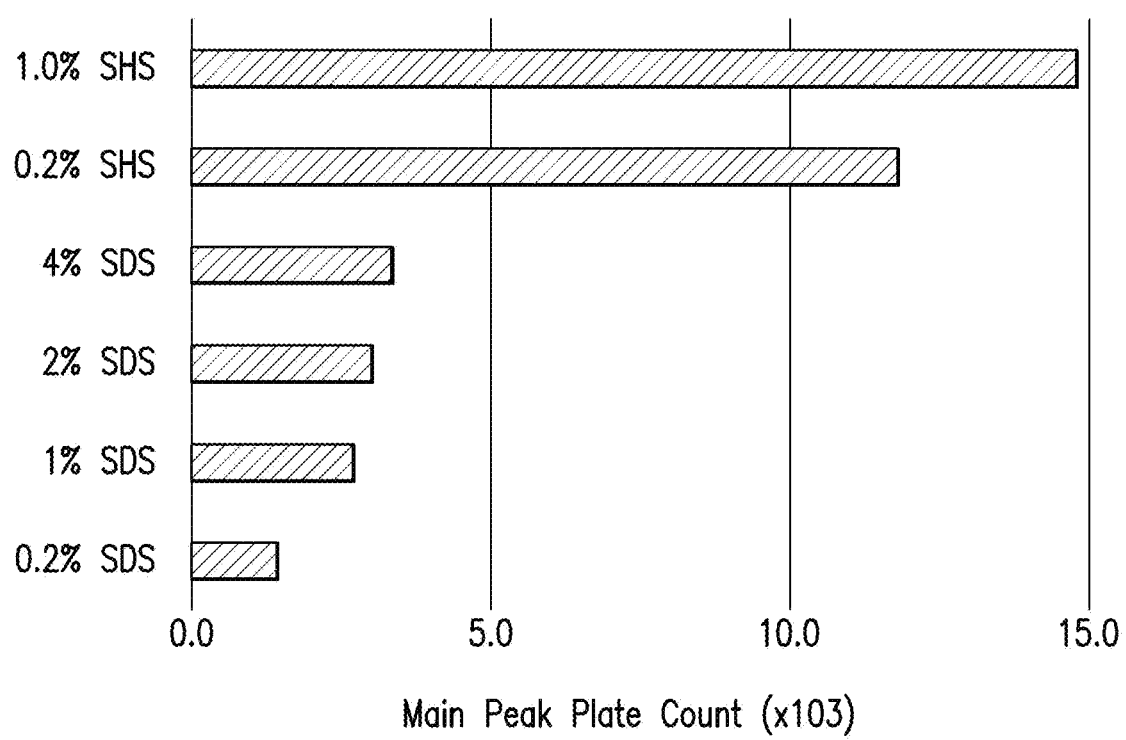

FIG. 4 shows the effect of varying gel buffer SDS (0.2%, 1%, 2%, or 4%) or SHS (0.2% or 1%) concentration on RTP-1 main peak plate count. The effect of SDS on plate count reached near saturation at concentrations>2.0%.

Figure 5A:
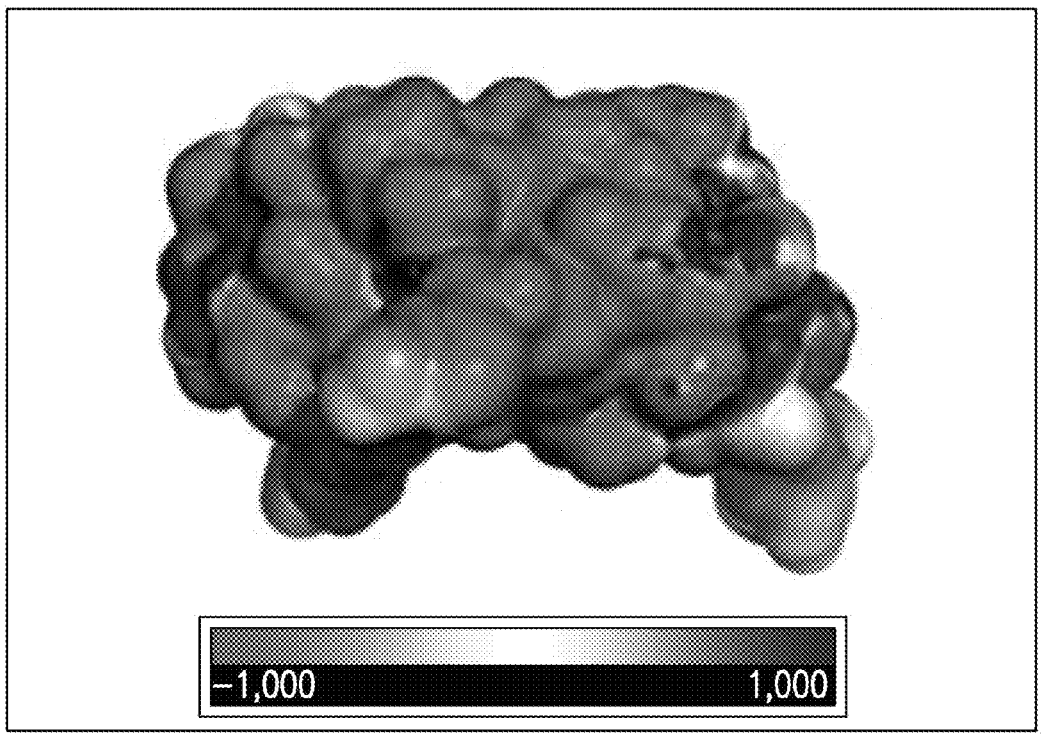
Figure 5B:
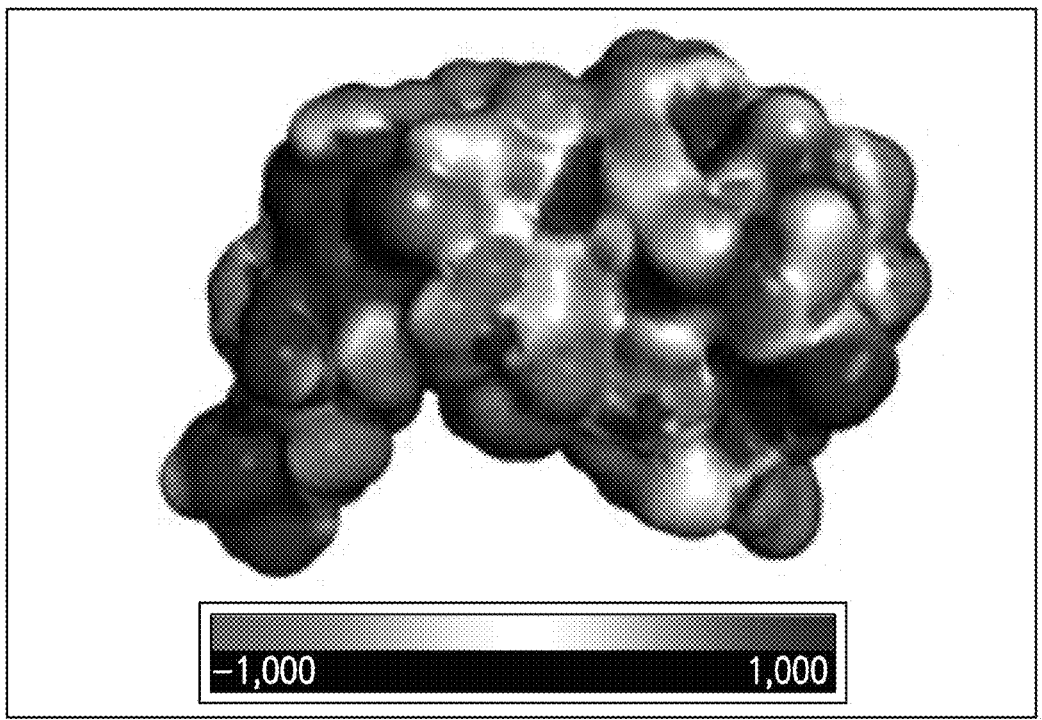

FIG. 5A and FIG. 5B show the charge surface profile of the domain 2 portion of RTP-1. Red and blue indicate negative and positive electrostatic charge, respectively. FIG. 5A and FIG. 5B show opposite surface exposed views. Note the high degree of negative charge on the surface shown in FIG. 5A, which may be a barrier to the binding of detergents except for those with longer hydrophobic tails like SHS which can better establish an energetically-favorable interaction with the hydrophobic core of the protein to initiate unfolding.

Figure 6A:
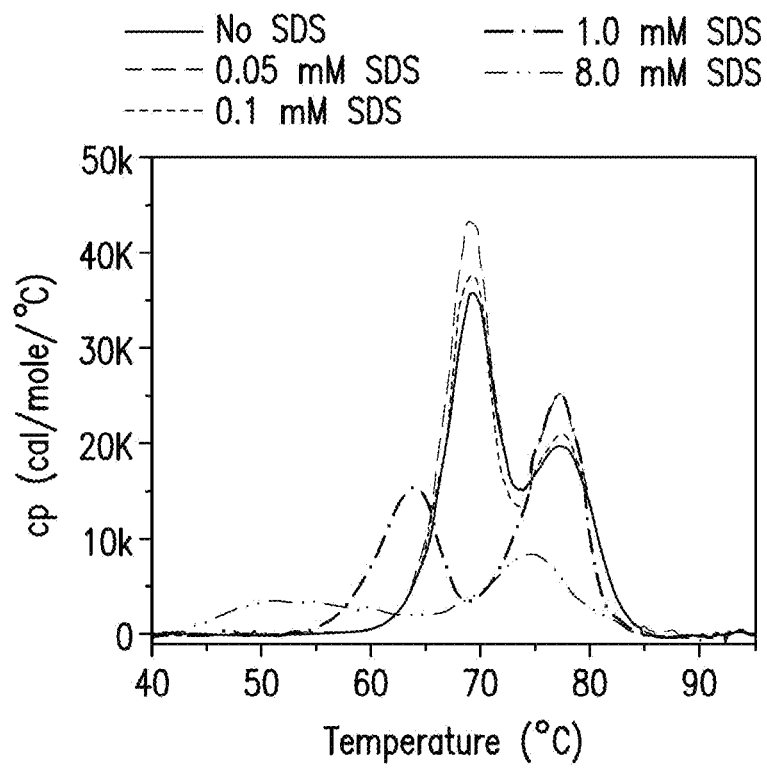
Figure 6B:
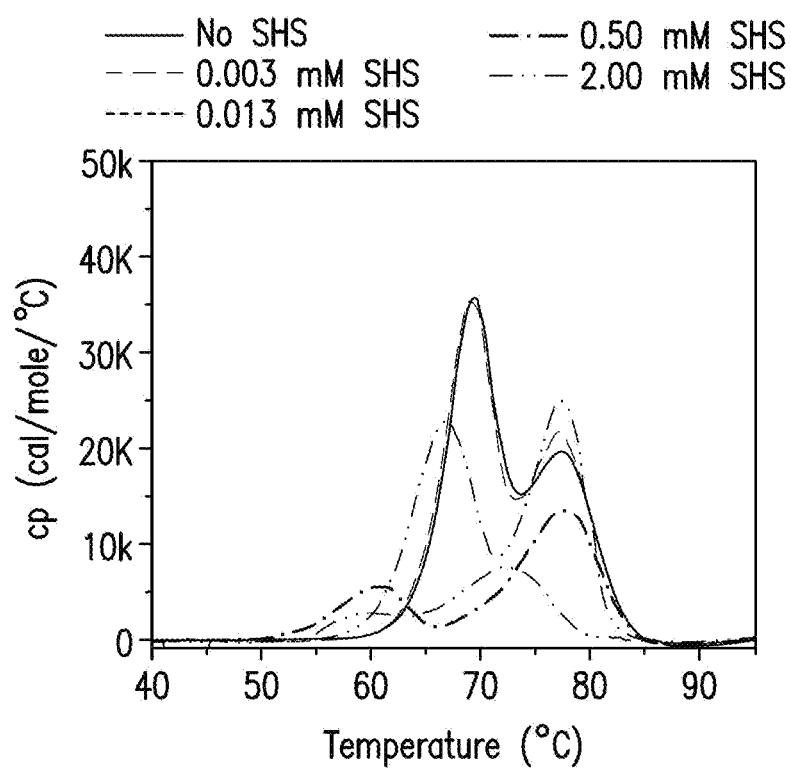
Figure 6C:
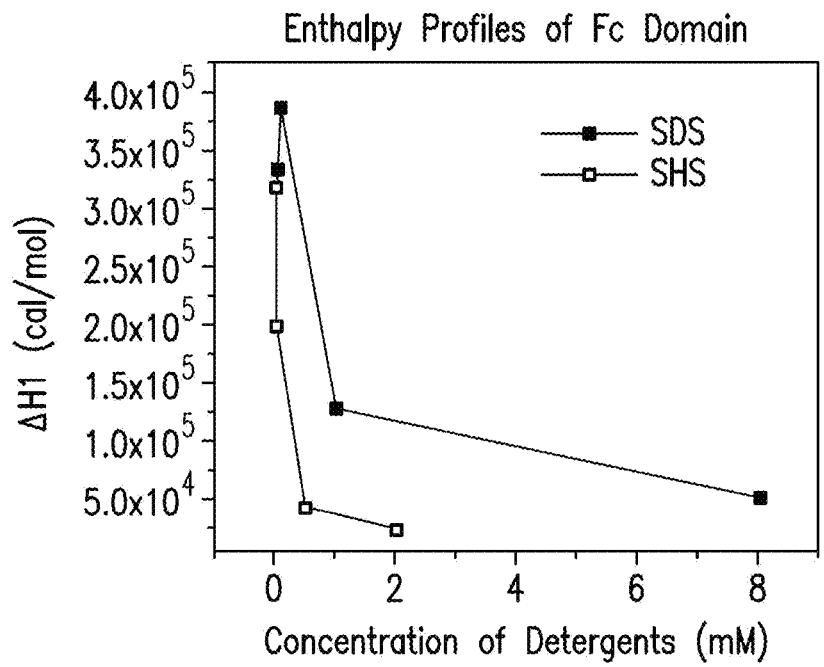
Figure 6D:
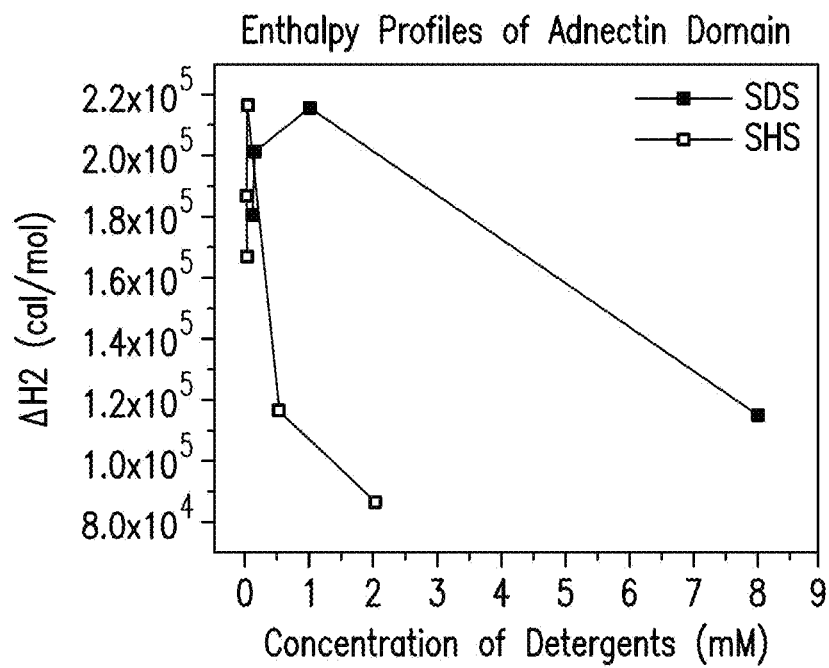

FIG. 6A-6D show SDS:RTP-1 and SHS:RTP-1 Differential Scanning calorimetry (DSC) profile comparisons. FIG. 6A shows the impact of varying the SDS concentration on the RTP-1 DSC profile, and FIG. 6B shows the impact of varying the SHS concentration. Two endothermal profiles are clearly visible, $E_1$ and $E_2$, representing domains 1 and 2 respectively, which were assessed for denaturation temperatures ($T_{m1}$ and $T_{m2}$) and enthalpy ($\Delta H_1$ and $\Delta H_2$). Values for these functions are listed in Table 2. Plots of the enthalpy changes of the two domains against detergent concentration are shown in FIGS. 6C and 6D.

Figure 7A:
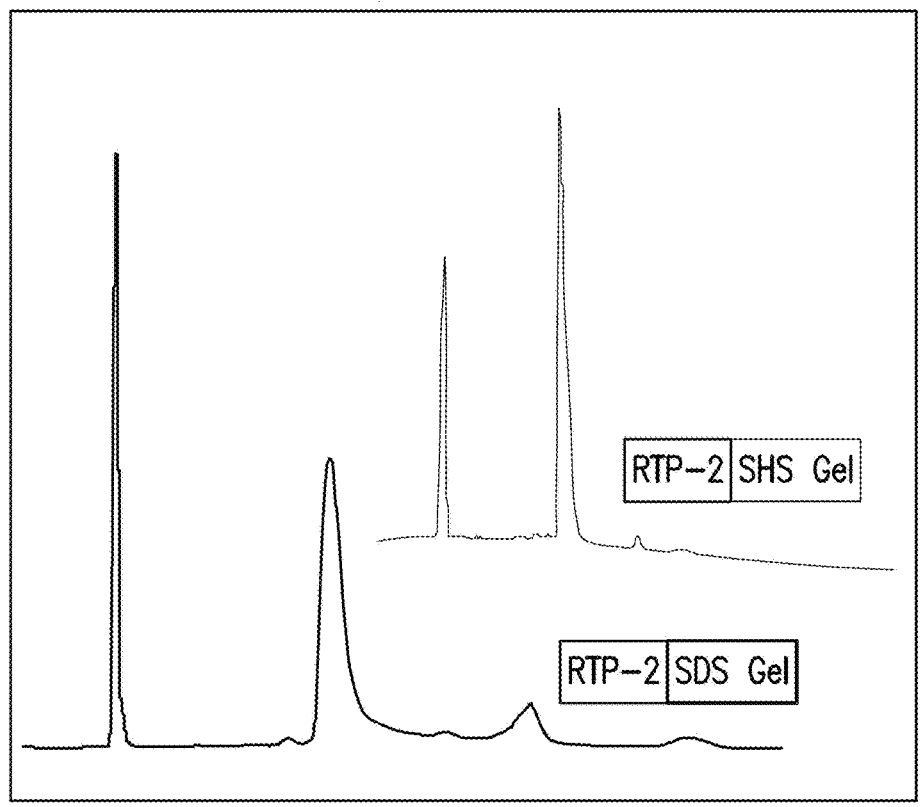
Figure 7B:
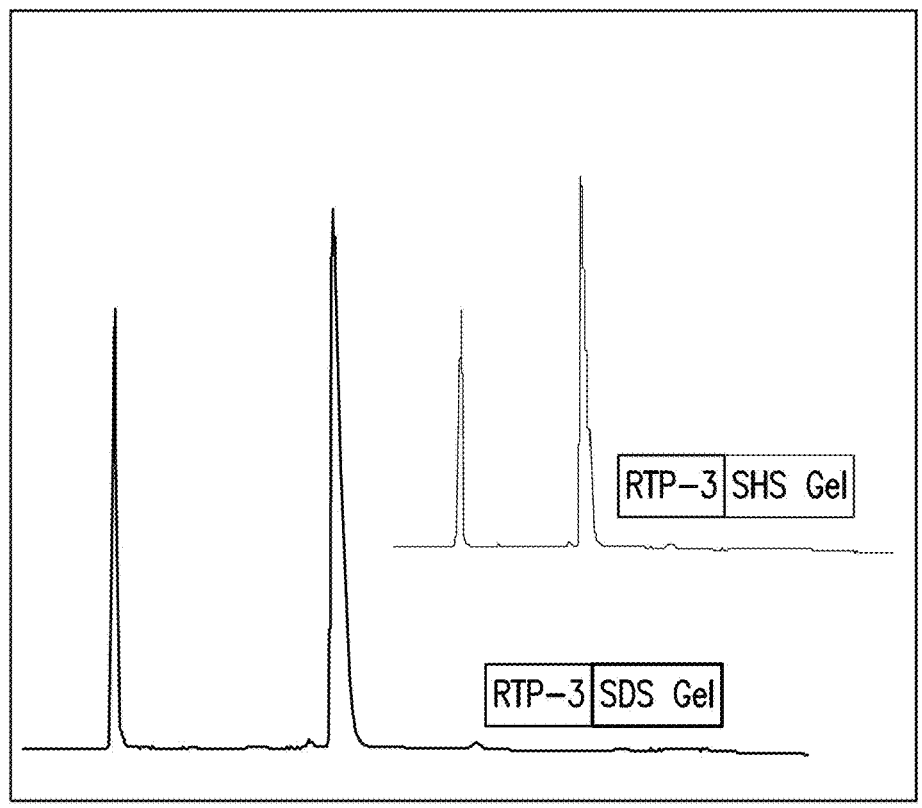

FIGS. 7A and 7B show CGE profiles of other proteins obtained using SDS and SHS gel buffer solutions: mAbs RTP-2 (FIG. 7A) and RTP-3 (FIG. 7B). RTP-2 (shown as RTP-2) has a relatively high proportion of hydrophobicity on its surface compared to RTP-3 (shown as RTP-3), suggesting a correlation between protein PSE and protein/detergent hydrophobicity. Black and red traces are electropherograms obtained from SDS and SHS gel buffer solutions respectively.

Figure 8:
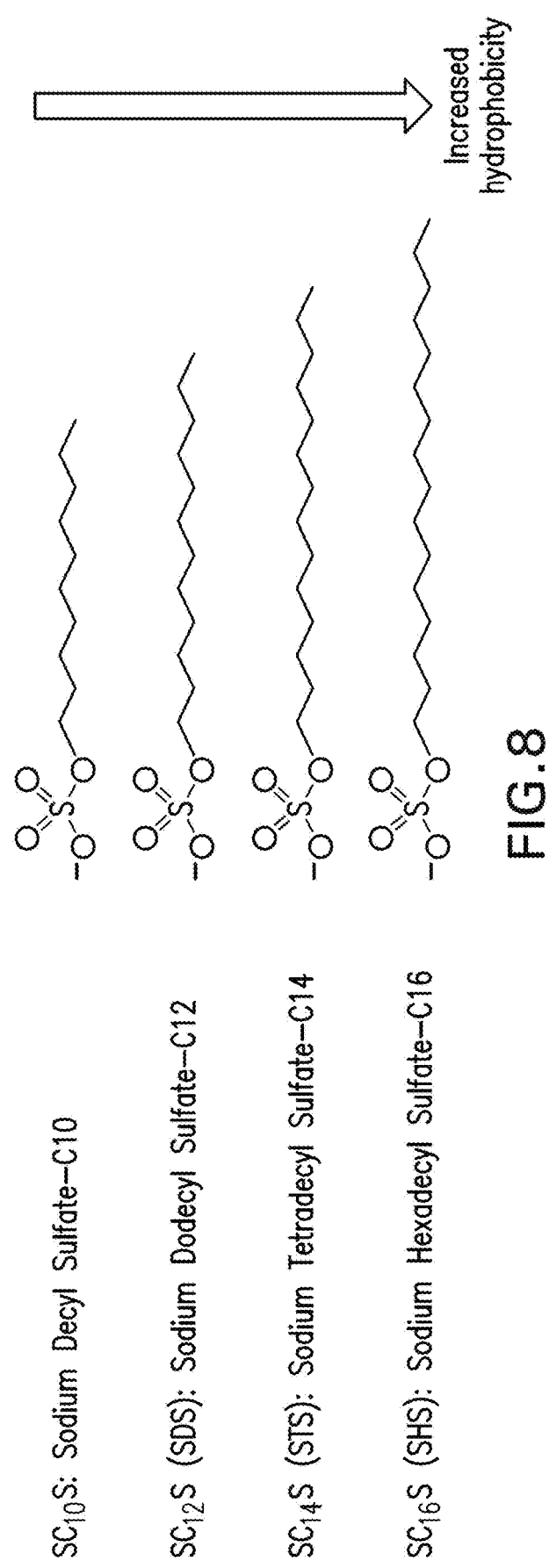

FIG. 8 shows the chemical structures of evaluated detergents (SUS, SDS, STS, and SHS).

Figure 9A:
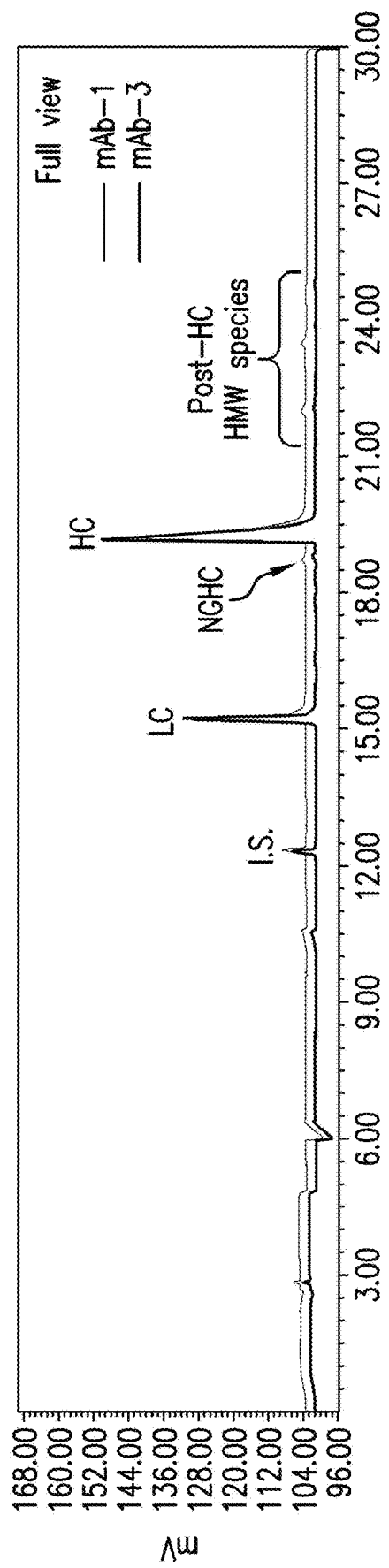
Figure 9B:
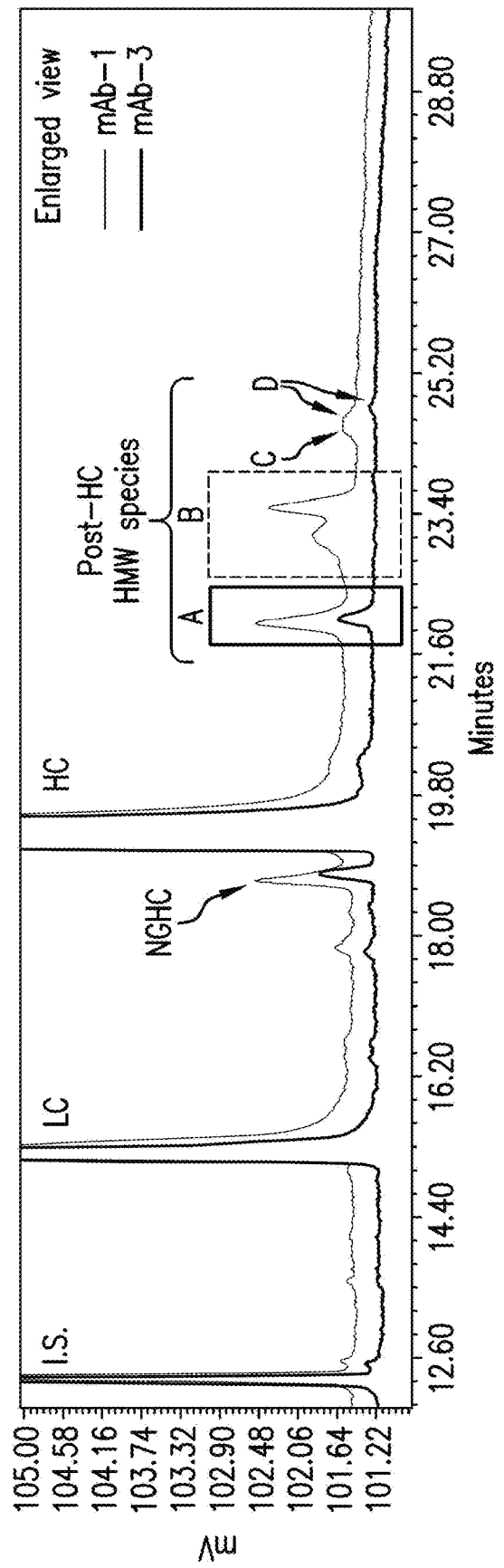

FIGS. 9A and 9B show electropherogram overlays of reduced mAb-1 and mAb-3 by CE-SDS (B) Traces in (A) enlarged at baseline level to show peak shape of NGHC and post-HC BMW species. LC=light chain; HC=heavy chain; NGHC=non-glycosylated heavy chain; BMW=high molecular weight. FIG. 9A shows full view, and FIG. 9B shows enlarged view. For both FIGS. 9A and 9B, the top line shows mAb-1, and the bottom line shows mAb-3.

Figure 10:
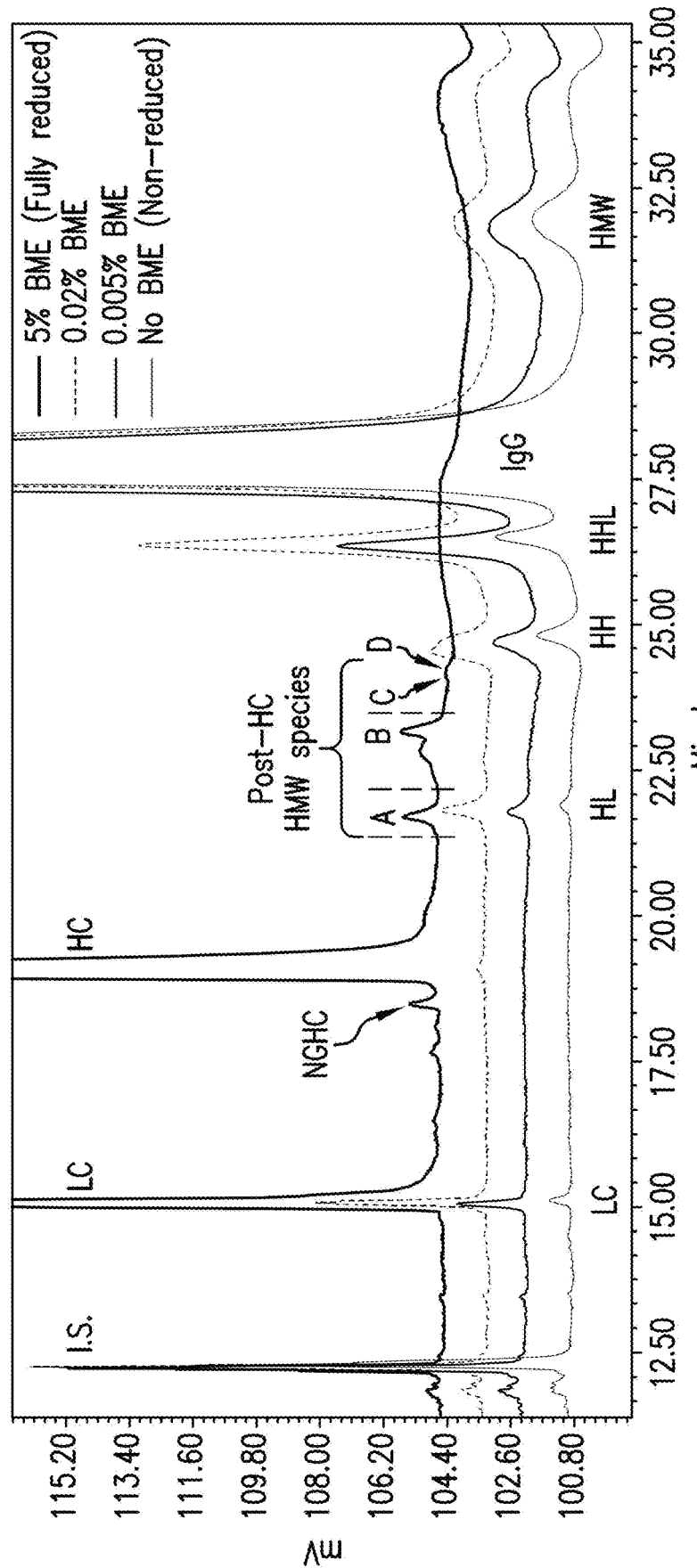

FIG. 10 shows enlarged electropherogram overlays of mAb-1 by CE-SDS under non-reducing (no 2-Mercaptoethanol (BME)), partially-reducing (0.005% and 0.02% BME) and reducing (5% BME) conditions. Note: Alkylating reagent IAM was added in the non-reducing and partially-reducing CE-SDS conditions to prevent the fragmentation of mAb-1 molecules caused by disulfide bond scrambling. The top, first line is for 5% BME (fully reduced); the second line is for 0.02% BME; the third line is for 0.005% BME; and the fourth line is for no BME (non reduced).

Figure 11A:
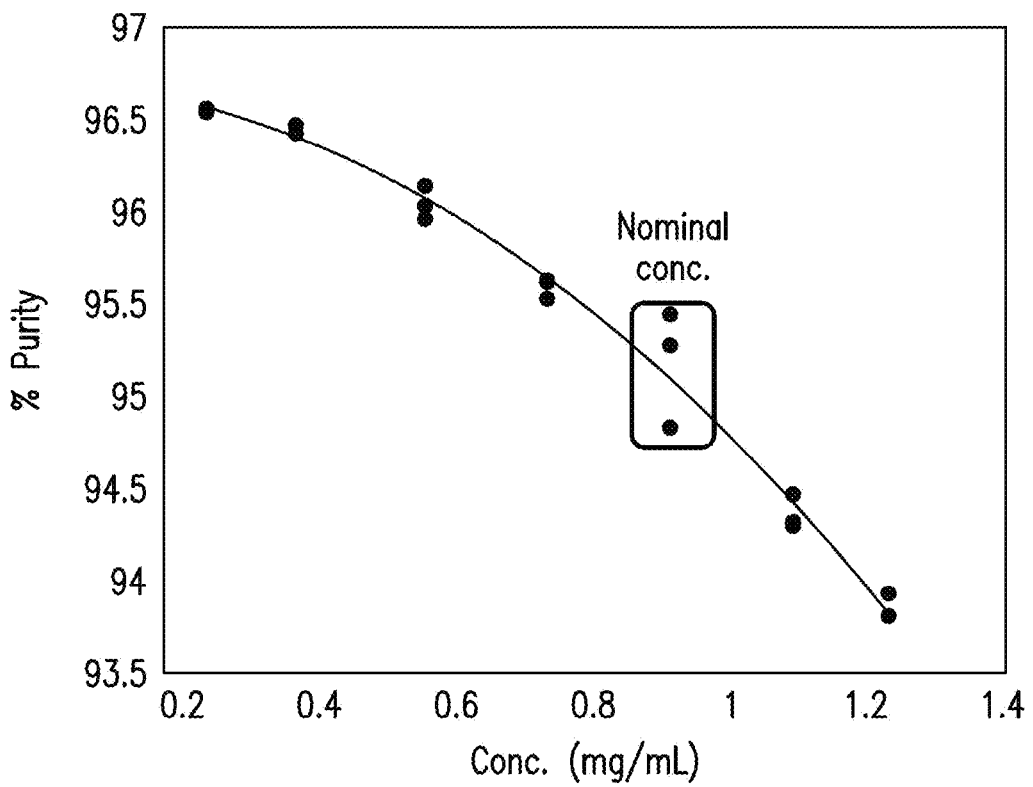
Figure 11B:
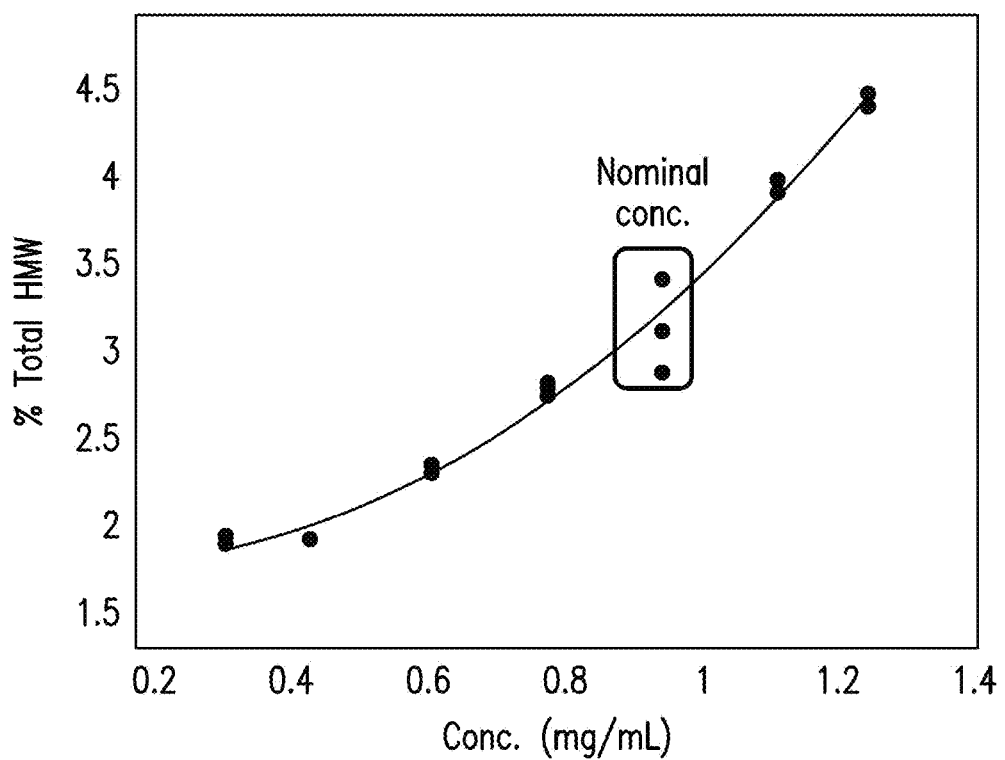

FIGS. 11A and 11B shows plots of relative percentage of Purity (LC+HC) (FIG. 11A) and Total post-HC HMW species (FIG. 11B) as a function of protein concentration within the range of 0.23-1.23 mg/mL.

Figure 12:
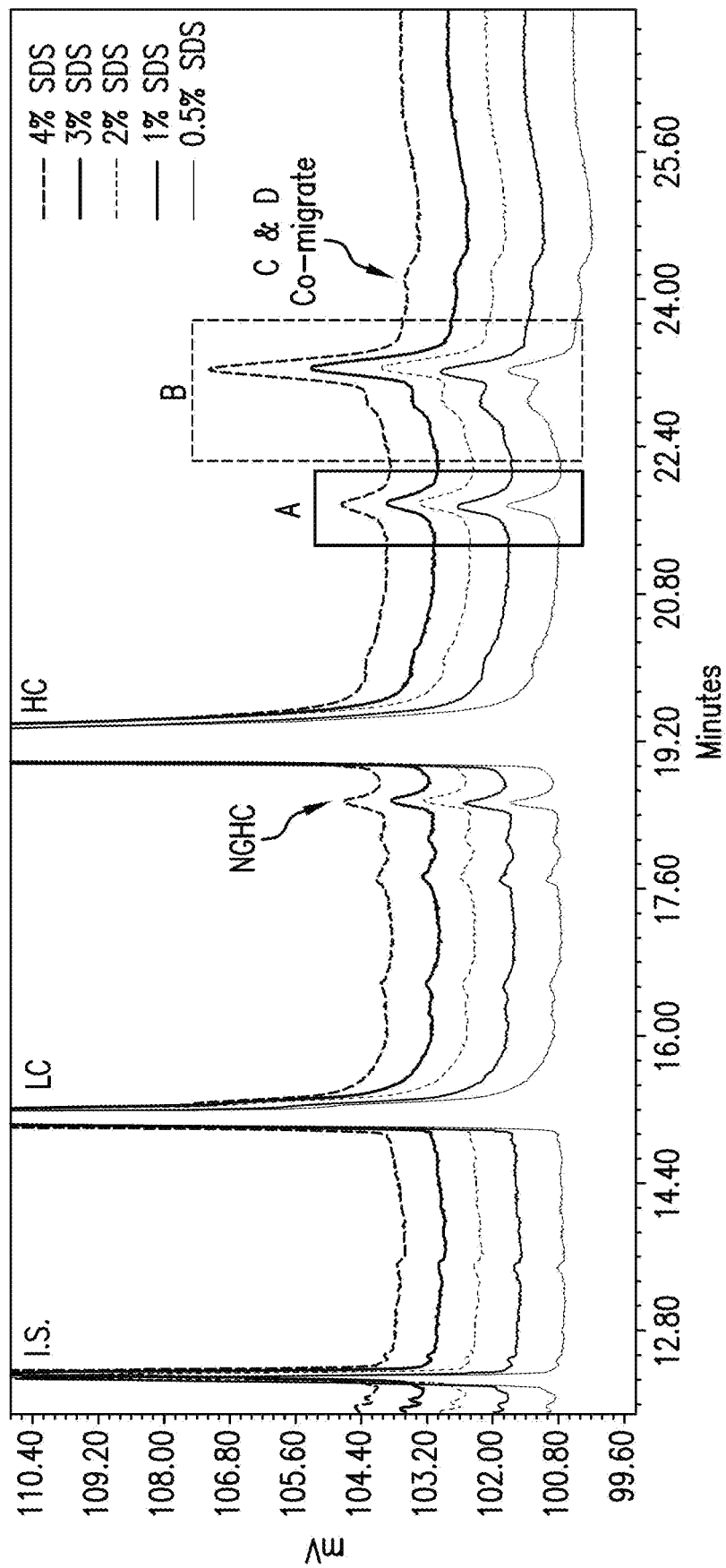

FIG. 12 shows enlarged electropherogram overlays of reduced mAb-1 samples prepared using sample buffers containing 0.5%-4% SDS and separated by SDS-based gel. The top, first line is for 4% SDS; the second line is for 3% SDS; the third line is for 2% SDS; the fourth line is for 1% SDS; and the bottom, fifth line is for 0.5% SDS.

Figure 13:
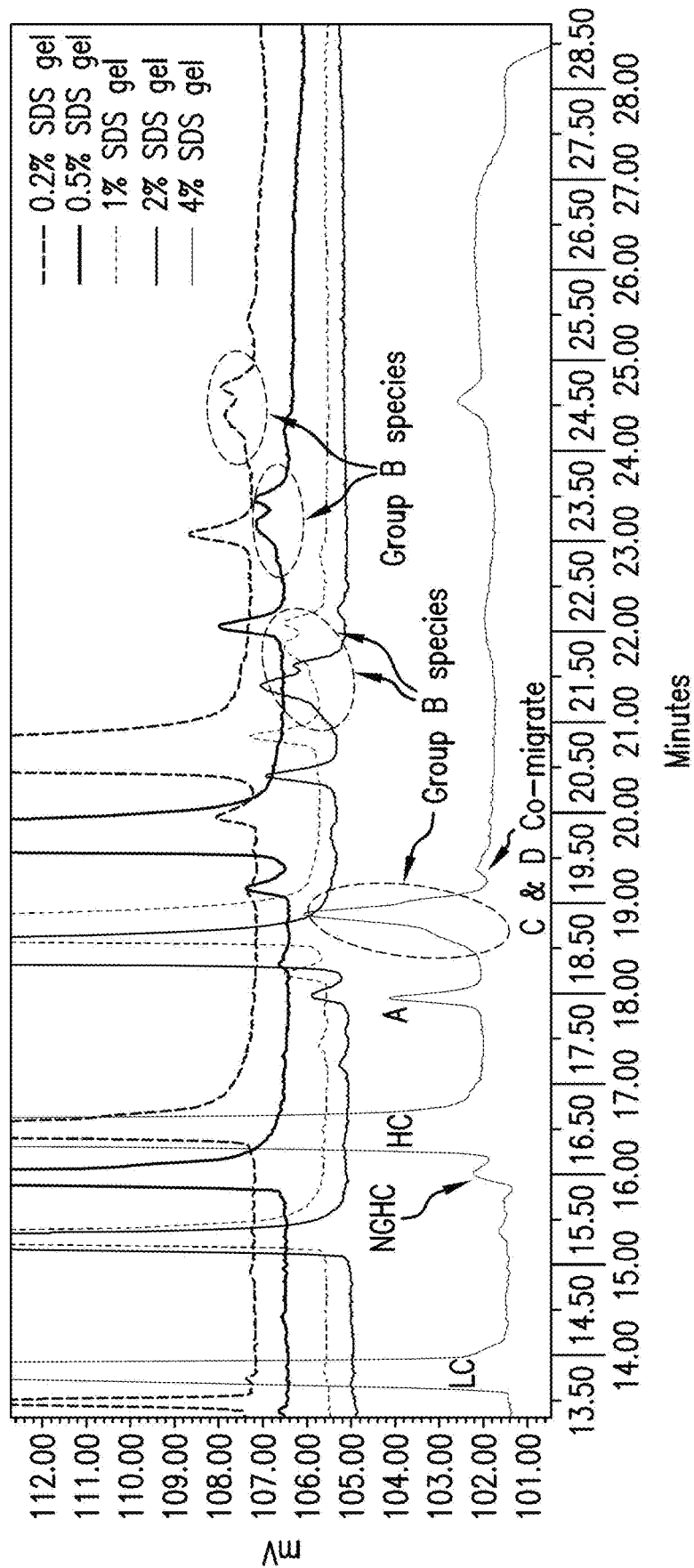

FIG. 13 shows enlarged electropherogram overlays of reduced mAb-1 samples prepared using sample buffer containing 1% SDS and separated using gel matrixes containing 0.2%-4% SDS. The top, first line is for 0.2% SDS gel; the second line is for SDS gel; the third line is for 1% SDS gel; the fourth line is for 2% SDS gel; and the bottom, fifth line is for 4% SDS gel.

Figure 14A:
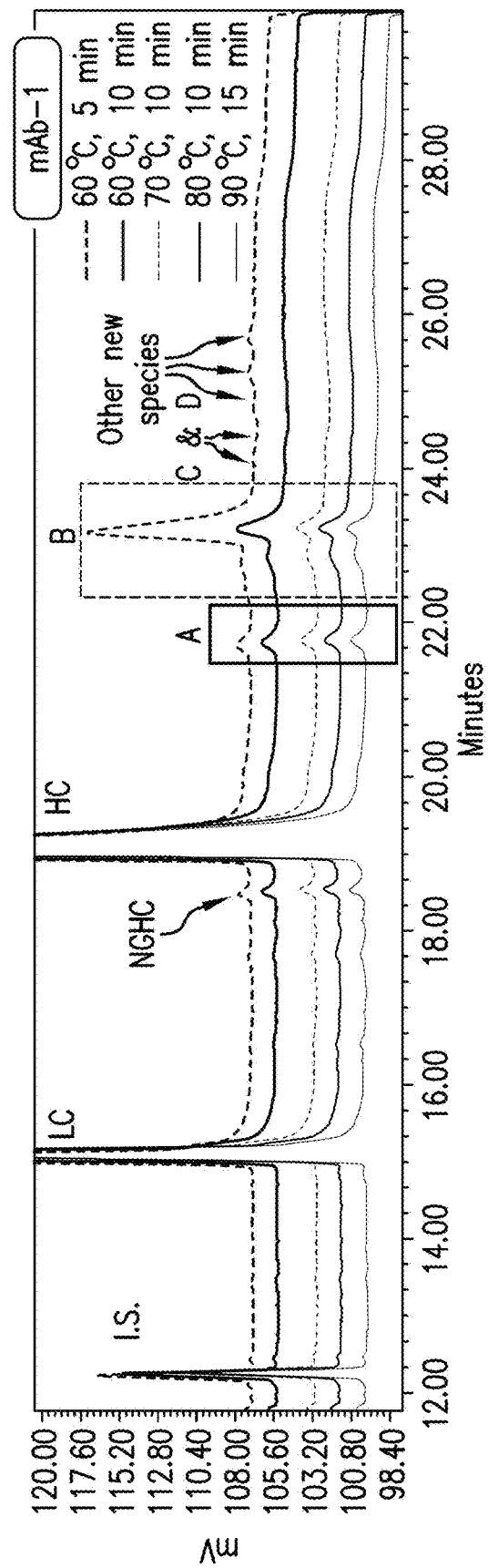
Figure 14B:
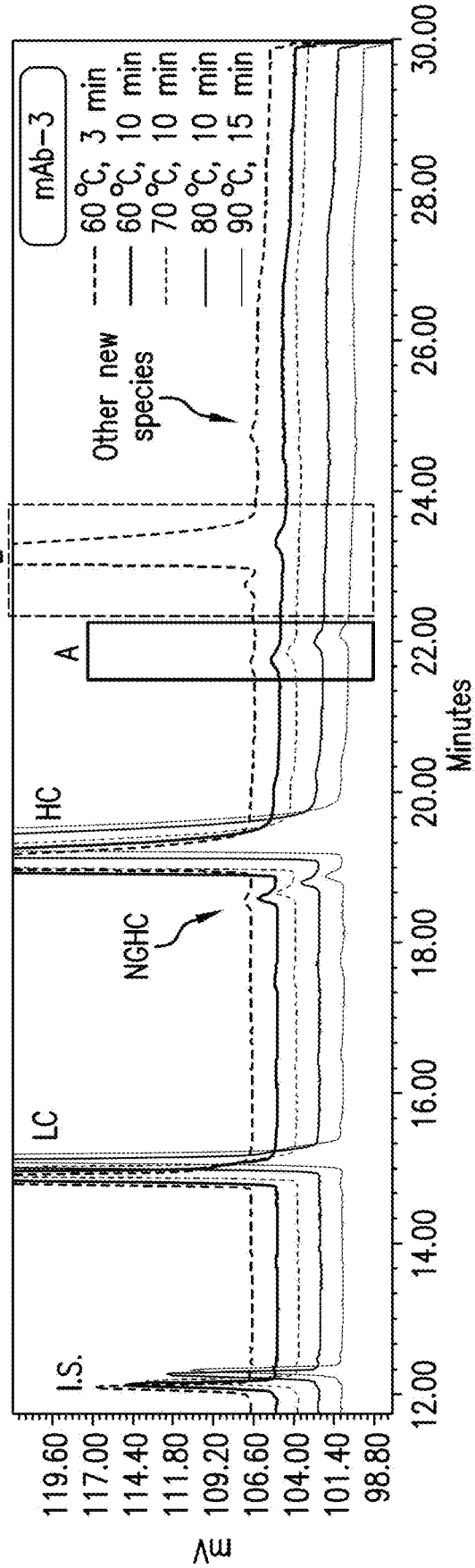

FIGS. 14A and 14B show enlarged electropherogram overlays of reduced mAb-1 (FIG. 14A) and mAb-3 (FIG. 14B) samples prepared using different incubation conditions by CE-SDS (1% SDS sample buffer+SDS-based gel). For both FIGS. 14A and 14B, the top first line shows an incubation condition of 60° C. for 5 minutes; the second line shows 60° C. for 10 minutes, the third line shows 70° C. for 10 minutes; the fourth line shows 80° C. for 10 minutes; and the bottom, fifth line shows 90° C. for 15 minutes.

Figure 15:
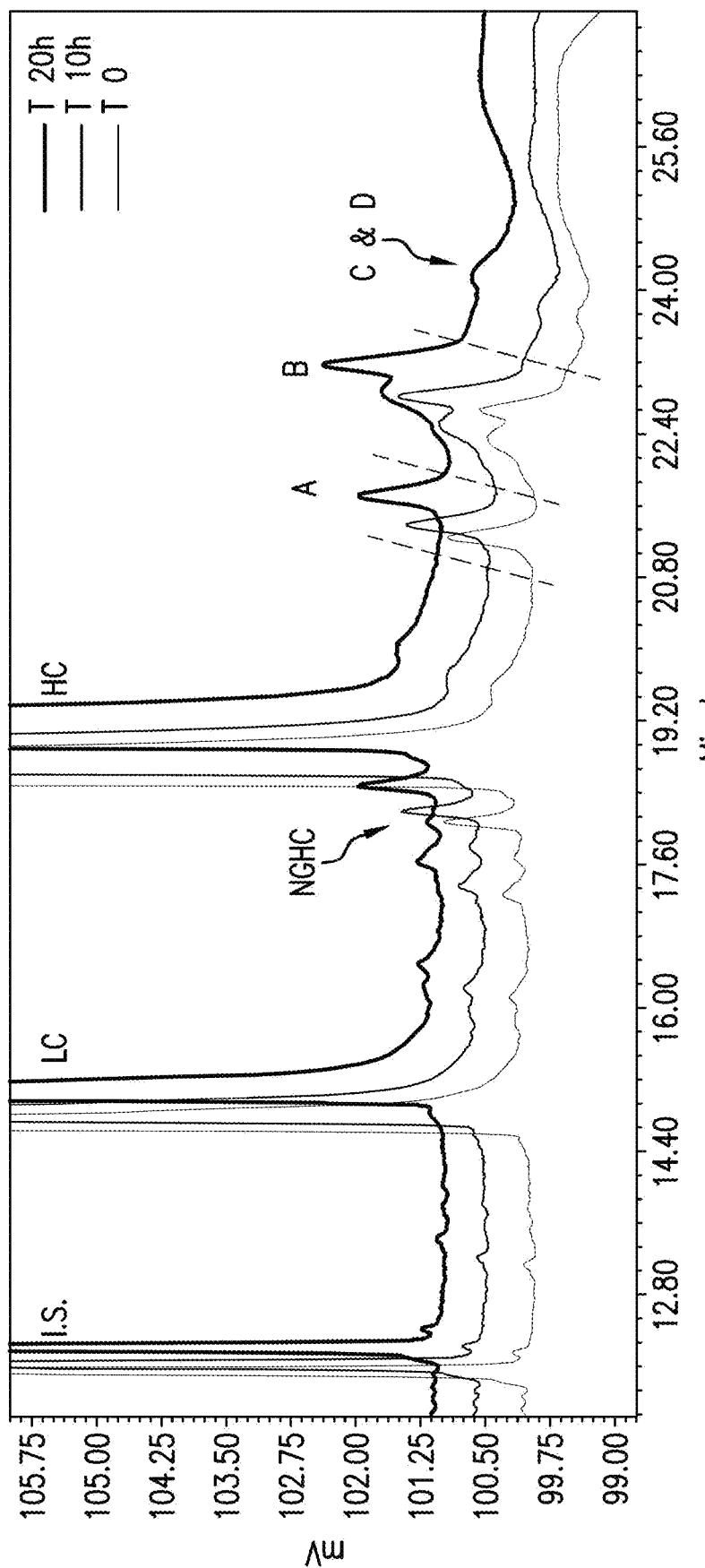

FIG. 15 shows enlarged electropherogram overlays of reduced mAb-1 in sample on-board stability test by CE-SDS. The bottom line shows the electropherogram result of storing the sample at 15° C. at the beginning of the storage; the middle line after 10 hours; and the top line after 20 hours.

FIGS. 16A and 16B show enlarged electropherogram overlays of reduced mAb-1 samples analyzed by different sample buffer and gel matrix condition combinations. In FIG. 16A, reduced mAb-1 samples were generated using sample buffers containing different detergents (2% $SC_{10}S$ sample buffer, 1% SDS sample buffer, and 0.5% STS sample buffer) and separated by running SDS-based gel (AB Sciex). The top line shows the electropherogram result of the 2% $SC_{10}S$ sample buffer. The middle line shows the electropherogram result of the 1% SDS sample buffer. The bottom line shows the electropherogram result of the 0.5% STS sample buffer. In FIG. 16B, reduced mAb-1 samples were generated using sample buffers containing different detergents (2% $SC_{10}S$ sample buffer, 1% SDS sample buffer, and 0.5% STS sample buffer) and separated by running SHS-based gel. The top line shows the electropherogram result of the 2% $SC_{10}S$ sample buffer. The middle line shows the electropherogram result of the 1% SDS sample buffer. The bottom line shows the electropherogram result of the 0.5% STS sample buffer.

Figure 17:
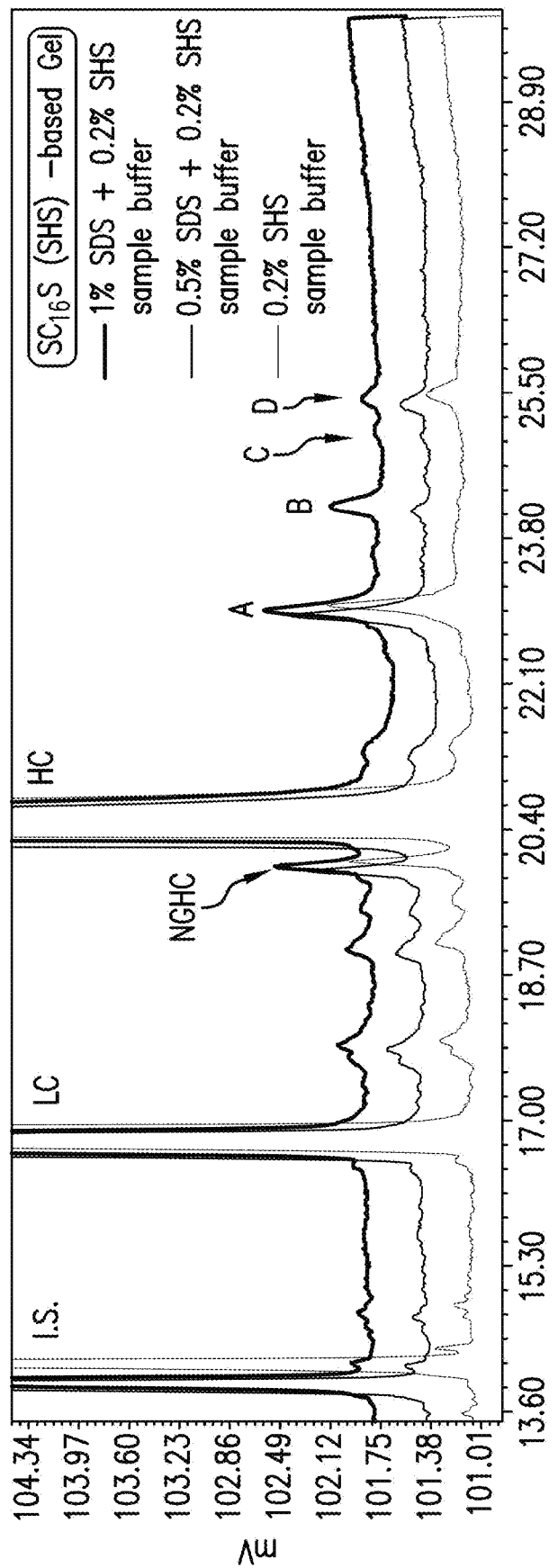

FIG. 17 shows enlarged electropherogram overlays of reduced mAb-1 samples generated using sample buffers containing detergent 0.2% SHS or mixtures of SDS and SHS (1% SDS+0.2% SHS or 0.5% SDS+0.2% SHS) and separated by running SHS-based gel. The top line shows the electropherogram result of the 1% SDS+0.2% SHS sample buffer. The middle line shows the electropherogram result of the 0.5% SDS+0.2% SHS sample buffer. The bottom line shows the electropherogram result of the 0.2% SHS sample buffer.

Figure 18:
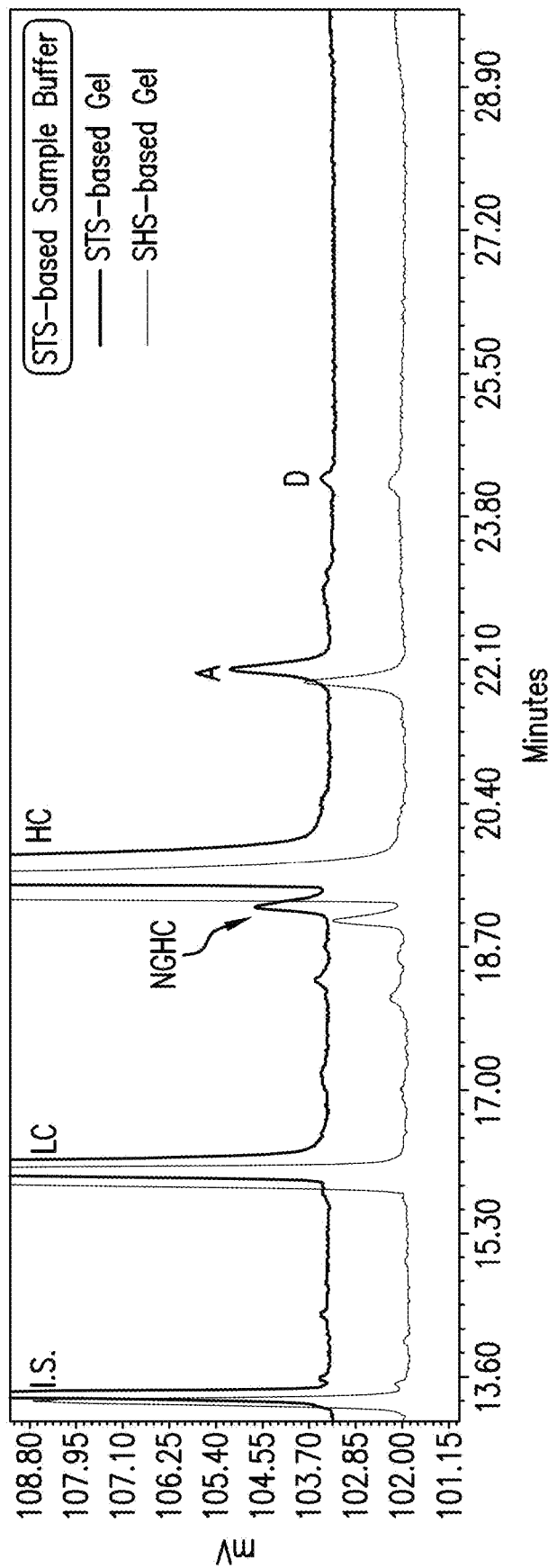

FIG. 18 shows enlarged electropherogram overlays of reduced mAb-1 samples generated using STS-containing sample buffer and separated by running SHS-based and STS-based gels. The top line shows the result of STS-based gel; and the bottom line shows the result of SHS-based gel.

Figure 19A:
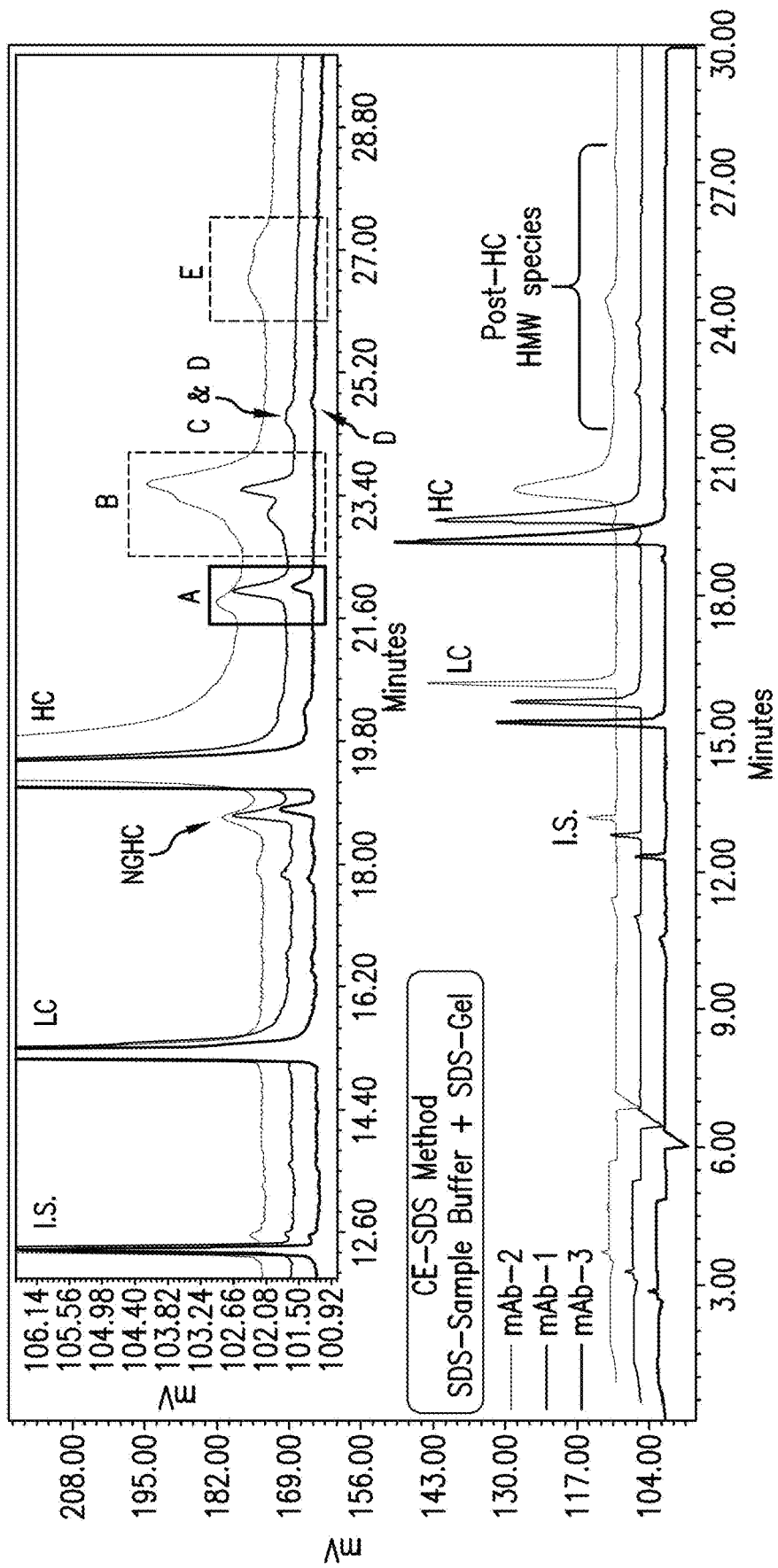
Figure 19B:
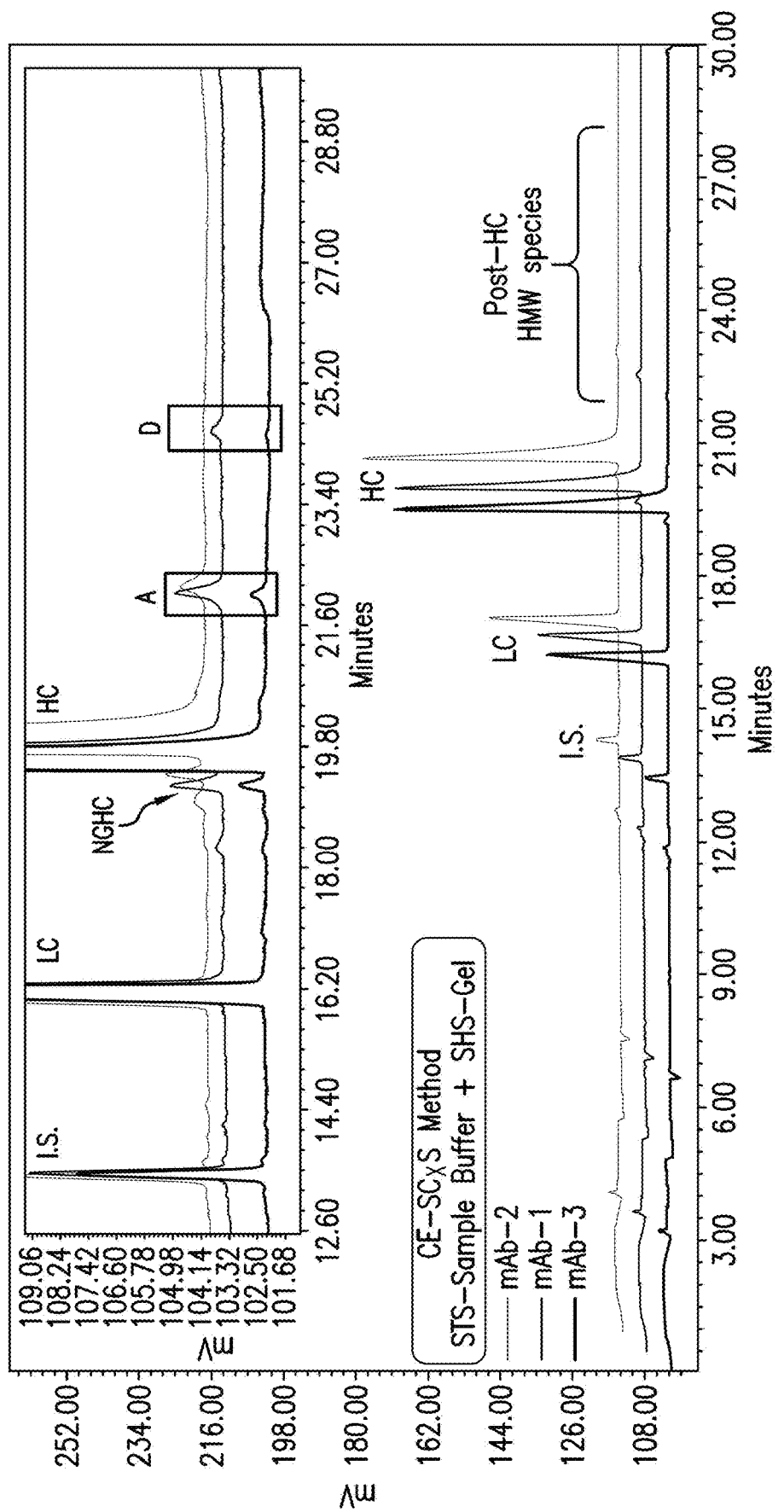

FIGS. 19A and 19B show enlarged electropherogram overlays of reduced mAb samples by CE-SDS method (FIG. 19A) and CE-SCXS method (a method using a hydrophobic detergent with the same head group but alkyl chain lengths different from SDS) (FIG. 19B). FIG. 19A shows the result of SDS-containing sample buffer and SDS-based sieving gel (AB Sciex); FIG. 19B shows the result of STS-containing sample buffer and SHS-based sieving gel. The top line shows the result of mAb-2; the middle line shows the result of mAb-1; and the bottom line shows the result of mAb-3.

FIG. 20 shows the chemical structures of $SC_{10}S$, SDS, and six detergents ($SC_{13}S$ to $SC_{18}S$) that are more hydrophobic than SDS.

DETAILED DESCRIPTION OF THE INVENTION

I. Terms

In order that the present disclosure can be more readily understood, certain terms are first defined. As used in this application, except as otherwise expressly provided herein, each of the following terms shall have the meaning set forth below. Additional definitions are set forth throughout the application.

The term "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

Unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary Of Biochemistry And Molecular Biology, Revised, 2000, Oxford University Press, provide one of skill with a general dictionary of many of the terms used in this disclosure.

Units, prefixes, and symbols are denoted in their Système International de Unites (SI) accepted form. Numeric ranges are inclusive of the numbers defining the range. The headings provided herein are not limitations of the various aspects of the disclosure, which can be had by reference to the specification as a whole. Accordingly, the terms defined immediately below are more fully defined by reference to the specification in its entirety.

The use of the alternative (e.g., "or") should be understood to mean either one, both, or any combination thereof of the alternatives. As used herein, the indefinite articles "a" or "an" should be understood to refer to "one or more" of any recited or enumerated component.

The terms "about" or "comprising essentially of" refer to a value or composition that is within an acceptable error range for the particular value or composition as determined by one of ordinary skill in the art, which will depend in part on how the value or composition is measured or determined, i.e., the limitations of the measurement system. For example, "about" or "comprising essentially of" can mean within 1 or more than 1 standard deviation per the practice in the art. Alternatively, "about" or "comprising essentially of" can mean a range of up to 20%. Furthermore, particularly with respect to biological systems or processes, the terms can mean up to an order of magnitude or up to of a value. When particular values or compositions are provided in the application and claims, unless otherwise stated, the meaning of "about" or "comprising essentially of" should be assumed to be within an acceptable error range for that particular value or composition.

As described herein, any concentration range, percentage range, ratio range or integer range is to be understood to include the value of any integer within the recited range and, when appropriate, fractions thereof (such as one tenth and one hundredth of an integer), unless otherwise indicated.

As used herein, the term "protein of interest" is used in its broadest sense to include any protein (either natural or recombinant), present in a mixture, for which purification is desired. Such proteins of interest include, without limitation, enzymes, hormones, growth factors, cytokines, immunoglobulins (e.g., antibodies), and/or any fusion proteins.

The terms "separating" or "isolating" as used interchangeably herein, refer to increasing the degree of purity of a protein of interest from a composition or sample comprising the protein of interest and one or more impurities. The separation or isolation can occur via electrophoresis, wherein an electric field is used to move negatively charged particles through a substance. When the particles have the same uniform electric charge, they migrate through the electric field based on their size, and the differential migration rates cause the particles, including proteins of interest, to be separated or isolated.

The term "buffer" as used herein, refers to a substance which, by its presence in solution, increases the amount of acid or alkali that must be added to cause unit change in pH. A buffered solution resists changes in pH by the action of its acid-base conjugate components. Buffered solutions for use with biological reagents are generally capable of maintaining a constant concentration of hydrogen ions such that the pH of the solution is within a physiological range. Traditional buffer components include, but are not limited to, organic and inorganic salts, acids and bases.

The term "electrophoresis buffer composition" as used herein, refers to a substance comprising at least one detergent that is capable of denaturing a protein. An electrophoresis buffer composition can be added directly to sample preparations as part of a sample buffer, to the electrophoresis running buffer, electrophoresis gel itself. Examples of electrophoresis buffer composition is described elsewhere herein.

The term "running buffer" refers to an electrophoresis buffer used in electrophoresis to help keep a specific pH range when current flows through the during the electrophoresis process. It refers to a substance which, by its presence in solution, increases the amount of acid or alkali that must be added to cause unit change in pH. A buffered solution resists changes in pH by the action of its acid-base conjugate components.

The term "sample buffer" refers to a buffer added to protein samples to prepare them to be run on a gel for analysis by electrophoresis. It refers to a substance which, by its presence in solution, increases the amount of acid or alkali that must be added to cause unit change in pH. A buffered solution resists changes in pH by the action of its acid-base conjugate components. A sample buffer may contain a detergent used to denature proteins and make them negatively charged. The sample buffer may also contain other components such as β-mercaptoethanol used to break disulfide bonds, or bromophenol blue used to follow the run of a protein sample in the gel.

The term "Peak Separation Efficiency" or "PSE" is defined by plate count and/or resolution. Plate count refers to a theoretical plate number (N) is an index that indicates column efficiency. It describes the number of plates as defined according to plate theory, and can be used to determine column efficiency based on calculation in which the larger the theoretical plate number the sharper the peaks. The theoretical plate number is included as a numerical value in column instruction manuals and inspection reports. Assuming a Gaussian distribution (normal distribution), the theoretical plate number can be calculated by:

$$N=16(R_t/W)^2$$

Where N=the number of theoretical plates (plate count), Rt is the retention/migration time of the peak, and W the peak width at baseline with tangents drawn to 61% of peak height.

Comparatively, The resolution of a elution is a quantitative measure of how well two elution peaks can be differentiated in a chromatographic separation. It is defined as the difference in retention times between the two peaks, divided by the combined widths of the elution peaks, where it is represented as follows:

$$R=2(R_{t2}-R_{t1})/(W_2+W_1)$$

Where R=the resolution between two peaks, $R_{t1}$ and $R_{t2}$ the retention/migration times of peaks 1 and 2 respectively, and $W_2+W_1$ the sum of peak widths at baseline with tangent lines drawn at 50% peak height.

As used herein the term "contaminant" is used in its broadest sense to cover any undesired component or compound within a mixture. In cell cultures, cell lysates, or clarified bulk (e.g., clarified cell culture supernatant), contaminants include, for example, host cell nucleic acids (e.g., DNA) and host cell proteins present in a cell culture medium. Host cell contaminant proteins include, without limitation, those naturally or recombinantly produced by the host cell, as well as proteins related to or derived from the protein of interest (e.g., proteolytic fragments) and other process related contaminants. In certain embodiments, the contaminant precipitate is separated from the cell culture using a means such as centrifugation, sterile filtration, depth filtration and tangential flow filtration.

The term "antibody" refers, in some embodiments, to a protein comprising at least two heavy (H) chains and two light (L) chains inter-connected by disulfide bonds. Each heavy chain is comprised of a heavy chain variable region (abbreviated herein as VH) and a heavy chain constant region (abbreviated herein as CH). In some antibodies, e.g., naturally-occurring IgG antibodies, the heavy chain constant region is comprised of a hinge and three domains, CH1, CH2 and CH3. In some antibodies, e.g., naturally-occurring IgG antibodies, each light chain is comprised of a light chain variable region (abbreviated herein as VL) and a light chain constant region. The light chain constant region is comprised of one domain (abbreviated herein as CL). The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, and FR4. The variable regions of the heavy and light chains contain a binding domain that interacts with an antigen. A heavy chain may have the C-terminal lysine or not. The term "antibody" can include a bispecific antibody or a multispecific antibody.

An "IgG antibody", e.g., a human IgG1, IgG2, IgG3 and IgG4 antibody, as used herein has, in some embodiments, the structure of a naturally-occurring IgG antibody, i.e., it has the same number of heavy and light chains and disulfide bonds as a naturally-occurring IgG antibody of the same subclass. For example, an IgG1, IgG2, IgG3 or IgG4 antibody may consist of two heavy chains (HCs) and two light chains (LCs), wherein the two HCs and LCs are linked by the same number and location of disulfide bridges that occur in naturally-occurring IgG1, IgG2, IgG3 and IgG4 antibodies, respectively (unless the antibody has been mutated to modify the disulfide bridges).

An immunoglobulin can be from any of the commonly known isotypes, including but not limited to IgA, secretory IgA, IgG and IgM. The IgG isotype is divided in subclasses in certain species: IgG1, IgG2, IgG3 and IgG4 in humans, and IgG1, IgG2a, IgG2b and IgG3 in mice. Immunoglobulins, e.g., IgG1, exist in several allotypes, which differ from each other in at most a few amino acids. "Antibody" includes, by way of example, both naturally-occurring and non-naturally-occurring antibodies; monoclonal and polyclonal antibodies; chimeric and humanized antibodies; human and nonhuman antibodies and wholly synthetic antibodies.

The term "antigen-binding portion" of an antibody, as used herein, refers to one or more fragments of an antibody that retain the ability to specifically bind to an antigen. It has been shown that the antigen-binding function of an antibody can be performed by fragments of a full-length antibody. Examples of binding fragments encompassed within the term "antigen-binding portion" of an antibody include (i) a Fab fragment (fragment from papain cleavage) or a similar monovalent fragment consisting of the VL, VH, LC and CH1 domains; (ii) a F(ab')2 fragment (fragment from pepsin cleavage) or a similar bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, (v) a dAb fragment (Ward et al., (1989) Nature 341:544-546), which consists of a VH domain; (vi) an isolated complementarity determining region (CDR) and (vii) a combination of two or more isolated CDRs which can optionally be joined by a synthetic linker. Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see, e.g., Bird et al. (1988) Science 242:423-426; and Huston et al. (1988) Proc. Natl. Acad. Sci. USA 85:5879-5883). Such single chain antibodies are also intended to be encompassed within the term "antigen-binding portion" of an antibody. These antibody fragments are obtained using conventional techniques known to those with skill in the art, and the fragments are screened for utility in the same manner as are intact antibodies. Antigen-binding portions can be produced by recombinant DNA techniques, or by enzymatic or chemical cleavage of intact immunoglobulins.

An "Fc region" (fragment crystallizable region), "Fc domain," or "Fc" refers to the C-terminal region of the heavy chain of an antibody that mediates the binding of the immunoglobulin to host tissues or factors, including binding to Fc receptors located on various cells of the immune system (e.g., effector cells) or to the first component (C1q) of the classical complement system. Thus, an Fc region comprises the constant region of an antibody excluding the first constant region immunoglobulin domain (e.g., CH1 or CL). In IgG, IgA and IgD antibody isotypes, the Fc region comprises two identical protein fragments, derived from the second (CH2) and third (CH3) constant domains of the antibody's two heavy chains; IgM and IgE Fc regions comprise three heavy chain constant domains (CH domains 2-4) in each polypeptide chain. The IgG isotype is divided in subclasses in certain species: IgG1, IgG2, IgG3 and IgG4 in humans, and IgG1, IgG2a, IgG2b and IgG3 in mice. For IgG, the Fc region comprises immunoglobulin domains CH2 and CH3 and the hinge between CH1 and CH2 domains. Although the definition of the boundaries of the Fc region of an immunoglobulin heavy chain might vary, as defined herein, the human IgG heavy chain Fc region is defined to stretch from an amino acid residue D221 for IgG1, V222 for IgG2, L221 for IgG3 and P224 for IgG4 to the carboxy-terminus of the heavy chain, wherein the numbering is according to the EU index as in Kabat. The CH2 domain of a human IgG Fc region extends from amino acid 237 to amino acid 340, and the CH3 domain is positioned on C-terminal side of a CH2 domain in an Fc region, i.e., it extends from amino acid 341 to amino acid 447 or 446 (if the C-terminal lysine residue is absent) or 445 (if the C-terminal glycine and lysine residues are absent) of an IgG. As used herein, the Fc region can be a native sequence Fc, including any allotypic variant, or a variant Fc (e.g., a non-naturally-occurring Fc).

An "Fc receptor" or "FcR" is a receptor that binds to the Fc region of an immunoglobulin. FcRs that bind to an IgG antibody comprise receptors of the FcγR family, including allelic variants and alternatively spliced forms of these receptors. The FcγR family consists of three activating (FcγRI, FcγRIII, and FcγRIV in mice; FcγRIA, FcγRIIA, and FcγRIIIA in humans) and one inhibitory (FcγRIIB) receptor. Various properties of human FcγRs are known in the art. The majority of innate effector cell types co-express one or more activating FcγR and the inhibitory FcγRIIB, whereas natural killer (NK) cells selectively express one activating Fc receptor (FcγRIII in mice and FcγRIIIA in humans) but not the inhibitory FcγRIIB in mice and humans. Human IgG1 binds to most human Fc receptors and is considered equivalent to murine IgG2a with respect to the types of activating Fc receptors that it binds to.

The term "recombinant human antibody," as used herein, includes all human antibodies that are prepared, expressed, created or isolated by recombinant means, such as (a) antibodies isolated from an animal (e.g., a mouse) that is transgenic or transchromosomal for human immunoglobulin genes or a hybridoma prepared therefrom, (b) antibodies isolated from a host cell transformed to express the antibody, e.g., from a transfectoma, (c) antibodies isolated from a recombinant, combinatorial human antibody library, and (d) antibodies prepared, expressed, created or isolated by any other means that involve splicing of human immunoglobulin gene sequences to other DNA sequences.

As used herein, "isotype" refers to the antibody class (e.g., IgG1, IgG2, IgG3, IgG4, IgM, IgA1, IgA2, IgD, and IgE antibody) that is encoded by the heavy chain constant region genes.

Amino acids are referred to herein by either their commonly known three letter symbols or by the one-letter symbols recommended by the IUPAC-IUB Biochemical Nomenclature Commission. Nucleotides, likewise, are referred to by their commonly accepted single-letter codes.

As used herein, the term "polypeptide" refers to a molecule composed of monomers (amino acids) linearly linked by amide bonds (also known as peptide bonds). The term "polypeptide" refers to any chain or chains of two or more amino acids, and does not refer to a specific length of the product. As used herein the term "protein" is intended to encompass a molecule comprised of one or more polypeptides, which can in some instances be associated by bonds other than amide bonds. On the other hand, a protein can also be a single polypeptide chain. In this latter instance the single polypeptide chain can in some instances comprise two or more polypeptide subunits fused together to form a protein. The terms "polypeptide" and "protein" also refer to the products of post-expression modifications, including without limitation glycosylation, acetylation, phosphorylation, amidation, derivatization by known protecting/blocking groups, proteolytic cleavage, or modification by non-naturally occurring amino acids. A polypeptide or protein can be derived from a natural The term "HMW species" refers to any one or more proteins that are of higher apparent molecular weight relative to the intact protein of interest, e.g., mAb-1. HMW species can be unrelated to the protein of interest or are aggregates, e.g., dimer or multimer or any combination of the intact protein and any fragment thereof. Two proteins or protein fragments thereof of different molecular weights may migrate together during electrophoresis because of non-uniform charge density due to non-uniform detergent coating of the proteins.

biological source or produced by recombinant technology, but is not necessarily translated from a designated nucleic acid sequence. It can be generated in any manner, including by chemical synthesis.

As described herein, any concentration range, percentage range, ratio range or integer range is to be understood to include the value of any integer within the recited range and, when appropriate, fractions thereof (such as one tenth and one hundredth of an integer), unless otherwise indicated.

The term "HMW species artifacts" or "HMW artifacts" as used herein refers to a peak or a band that can show up as a result of inefficient electrophoresis under reducing and/or non-reducing conditions. The HMW artifacts thus can lead to underestimated purity results and insufficient assay robustness. Under non-reducing conditions, the HMW artifacts shown in the profiles of two mAbs can be protein species not fully denatured and hence not uniformly coated with a detergent, which co-migrate with the inherent protein aggregate species. The aggregate levels with HMW species artifacts measured by non-reduced CE-SDS method can be significantly higher than the values reported by other orthogonal methods, such as native size exclusion chromatography (SEC) and analytical ultracentifugation (AUC).

As used herein, the term "mAb-1" refers to an anti-IL8 antibody (HuMax-IL8). Any anti-IL-8 antibodies can be used for the present disclosure, but the anti-IL8 antibody used herein as an example is described in PCT publication no. WO2004/058797, published Jul. 15, 2004.

The term "mAb-2" or "RTP-2" as used herein refers to an anti-TIGIT antibody. Any anti-TIGIT antibodies can be used for the present disclosure, but the anti-TIGIT antibody used in the disclosure is described in PCT publication no. WO2016/106302, published Jun. 30, 2016.

The term "mAb-3" as used herein refers to an anti-IP-10 antibody. Any anti-IL-10 antibody can be used for the present disclosure, but the anti-IP-10 antibody used in this application is described in PCT publication nos. WO2005/058815, published Jun. 30, 2005, and WO2017/095875, published Jun. 8, 2017 and U.S. Pat. No. 9,429,581, issued Aug. 30, 2016.

Various aspects of the disclosure are described in further detail in the following subsections.

II. Electrophoresis Buffer Composition

Recombinant protein expression, e.g., expression of recombinant monoclonal antibodies, is complex and requires numerous post-translational modifications along with chemical and physical degradation. Therefore, therapeutic protein expression requires constant observation during each stage of development and production. Analytical methods which are able to provide reliable and robust assessment of protein purity, heterogeneity and stability are necessary to support product characterization in process development and quality control of therapeutic proteins.

Capillary gel electrophoresis (CGE) using sodium dodecyl sulfate, commonly referred as CE-SDS, is the capillary format of polyacrylamide gel electrophoresis (SDS-PAGE), wherein the polyacrylamide slab gel is replaced with a narrow-bore glass capillary filled with a replaceable polymer sieving matrix. In contrast to traditional labor-insensitive SDS-PAGE, CE-SDS is able to measure the overall fragmentation pattern and perform accurate protein quantitation with advantages including direct on-column UV or fluorescence detection, automation, and enhanced resolution and reproducibility.

SDS has been extensively utilized as the default detergent in both SDS-PAGE and CE-SDS techniques for protein denaturation, which can be attributed to a widely accepted fact that protein tends to bind a relatively constant amount of SDS on a weight basis (~1.4 g of SDS/1 g of protein), resulting uniform mass/charge ratios of SDS-protein complexes in most cases. Consequently, intrinsic polypeptide charges of protein molecules become negligible and the final separation depends entirely on differences in the relative molecular mass of their denatured polypeptides.

However, there are scenarios where SDS cannot uniformly bind some proteins due to their charge and glycosylation profile, and thus there is poor protein peak separation efficiency which suggests relatively low SDS binding affinity and/or incomplete denaturation. This recently identified problem in analysis in part due to the fact that high molecular weight (HMW) artifacts were induced in purity analysis protein molecules under both non-reducing and reducing CE-SDS conditions, leading to underestimated purity results and insufficient assay robustness. Under non-reducing conditions, the HMW artifacts shown in the profiles of two mAbs were likely protein species not fully denatured and hence not uniformly coated with detergent SDS, which co-migrate with the inherent protein aggregate species. Their aggregate levels measured by non-reduced CE-SDS method were significantly higher than the values reported by other orthogonal methods, such as native size exclusion chromatography (SEC) and analytical ultracentifugation (AUC). By applying an SHS-containing sieving gel and maintaining sample denaturation using regular SDS-based sample buffer, the formation of HMW artifacts were successfully suppressed and thus more reliable purity results accompanying with reasonable aggregate levels were reported for these two mAbs. The levels of these artifacts were significantly impacted by sample preparation parameters such as the protein concentration, SDS amount in the sample buffer, running buffer, or gel matrix. It was discovered that adding the relative hydrophobic detergents to the sample, not just the gel buffer, exhibited improved power to sufficiently denature an HC of monoclonal antibody 1 (mAb-1) and monoclonal antibody 2 (mAb-2) and therefore prevent the production of post-HC HMW artifacts.

The detergents evaluated and useful for the present disclosure can contain the same charged sulfate head group and sodium counter-ion, only varying in alkyl chain length. The detergents can be included in a buffer and/or a gel as an electrophoresis buffer composition. In some embodiments, an electrophoresis buffer composition for the disclosure comprises a hydrophobic detergent comprising a sulfate head group and a hydrophobic tail comprising an alkyl chain having 11 carbon atoms, or an alkyl chain having greater than 12 carbon atoms. In some embodiments, the electrophoresis buffer composition comprises a hydrophobic detergent with an alkyl chain that has carbon atoms less than 19 or 20. In some embodiments, the hydrophobic detergent has a sulfate head group and an alkyl chain having 13 to 20 carbon atoms, 13 to 19 carbon atoms, 13 to 18 carbon atoms, 14 to 18 carbon atoms, 14 to 19 carbon atoms, 14 to 20 carbon atoms, 15 to carbon atoms, 15 to 19 carbon atoms, 15 to 18 carbon atoms, 16 to 20 carbon atoms, 16 to 19 carbon atoms, 16 to 18 carbon atoms, 17 to 20 carbon atoms, 17 to 19 carbon atoms, or 17 to 18 carbon atoms. In other embodiments, the hydrophobic detergent has a sulfate head group and an alkyl chain having 13, 14, 15, 16, 17, 18, 19, or 20 carbon atoms. In other embodiments, the hydrophobic detergent has a sulfate head group and an alkyl chain having 18 atoms. In some embodiments, the hydrophobic detergent has a sulfate head group and an alkyl chain having 16 atoms. For the purpose of the present disclosure, the sulfate head group in the hydrophobic detergent has a net negative point charge at least as high as the sulfate head group in sodium dodecyl sulfate. In some embodiments, the hydrophobic detergent is more hydrophobic than sodium dodecyl sulfate. In other embodiments, the hydrophobic detergent is capable of inducing improved protein peak separation efficiency by capillary sieving electrophoresis compared to sodium dodecyl sulfate.

In some embodiments, the hydrophobic detergent is selected from a group consisting of sodium tridecyl sulfate, sodium tetradecyl sulfate (STS), sodium pentadecyl sulfate, sodium hexadecyl sulfate (SHS), sodium heptadecyl sulfate, and sodium octadecyl sulfate (SOS). In some embodiments, the hydrophobic detergent is sodium hexadecyl sulfate (SHS). These embodiments are represented in FIG. 20.

In some embodiments, the hydrophobic detergent is at a concentration of from about 0.001% to about 4% w/v in a sample buffer, a running buffer, and/or a gel. In some embodiments, the ranges of concentration over which a hydrophobic detergent can be used for the preparation of an electrophoresis buffer or gel according to the present disclosure, e.g., about 5% or less, about 4.5% or less, about 4% or less, about 3.5% or less, about 3% or less, about 2.5% or less, about 2% or less, about 1.5% or less, about 1% or less, about or less, about 0.8% or less, about 0.7% or less, about 0.6% or less, about 0.5% or less, about 0.4% or less, about 0.3% or less, about 0.2% or less, about 0.1% or less, about 0.09% or less, about 0.08% or less, about 0.07% or less, about 0.06% or less, about 0.05% or less, about 0.04% or less, about 0.03% or less, about 0.02% or less about 0.01% or less, or about or less. The ranges of the hydrophobic detergent can be from about 0.001% to about 0.5%, 0.01% to about 0.5%, from about 0.02% to about 0.5%, from 0.03% to about from 0.04% to about 0.5%, from 0.05% to about 0.5%, from 0.06% to about 0.5%, from 0.07% to about 0.5%, from 0.08% to about 0.5%, from 0.09% to about 0.5%, from about 0.1% to about 0.5%, from about 0.2% to about 0.5%, from about 0.3% to about 0.5%, from about 0.4% to about 0.5%, about 0.02% to about 0.4%, from 0.03% to about 0.4%, from 0.04% to about 0.4%, from 0.05% to about 0.4%, from 0.06% to about 0.4%, from to about 0.4%, from 0.08% to about 0.4%, from 0.09% to about 0.4%, from about to about 0.4%, from about 0.2% to about 0.4%, from about 0.3% to about 0.4%, about to about 0.3%, from 0.03% to about 0.3%, from 0.04% to about 0.3%, from 0.05% to about 0.3%, from 0.06% to about 0.3%, from 0.07% to about 0.3%, from 0.08% to about 0.3%, from 0.09% to about 0.3%, from about 0.1% to about 0.3%, from about 0.2% to about 0.3%, about 0.02% to about 0.2%, from 0.03% to about 0.2%, from 0.04% to about from 0.05% to about 0.2%, from 0.06% to about 0.2%, from 0.07% to about 0.2%, from 0.08% to about 0.2%, from 0.09% to about 0.2%, from about 0.1% to about 0.2%, about 0.02% to about 0.1%, from 0.03% to about 0.1%, from 0.04% to about 0.1%, from 0.05% to about 0.1%, from 0.06% to about 0.1%, from 0.07% to about 0.1%, from 0.08% to about 0.1%, or from 0.09% to about 0.1%. In other embodiments, the concentration range of the hydrophobic detergent is from about 0.001% to about 4%, from about 0.01% to about 4%, from about 0.02% to about 4%, from about 0.03% to about 4%, from about 0.04% to about 4%, from about 0.05% to about 4%, from about 0.06% to about 4%, from about 0.07% to about 4%, from about 0.08% to about 4%, from about 0.09% to about 4%, from about 0.1% to about 4%, about 0.2% to about 4%, about 0.3% to about 4%, about 0.4% to about 4%, about 0.5% to about 4%, about 0.6% to about 4%, about 0.7% to about 4%, about to about 4%, about 0.9% to about 4%, about 1% to about 4%, from about 0.1% to about 3%, about 0.2% to about 3%, about 0.3% to about 3%, about 0.4% to about 3%, about 0.5% to about 3%, about 0.6% to about 3%, about 0.7% to about 3%, about 0.8% to about 3%, about 0.9% to about 3%, about 1% to about 3%, from about 0.1% to about 2%, about to about 2%, about 0.3% to about 2%, about 0.4% to about 2%, about 0.5% to about 2%, about 0.6% to about 2%, about 0.7% to about 2%, about 0.8% to about 2%, about 0.9% to about 2%, about 1% to about 2%, from about 0.1% to about 1%, about 0.2% to about 1%, about 0.3% to about 1%, about 0.4% to about 1%, about 0.5% to about 1%, about 0.6% to about 1%, about 0.7% to about 1%, about 0.8% to about 1%, about 0.9% to about 1%, or about 1% to about 2%. In some embodiments, the concentration of the hydrophobic detergent can be about 0.001%, about 0.01%, about 0.02%, about 0.03%, about 0.04%, about 0.05%, about 0.06%, about 0.07%, about 0.08%, about 0.09%, about 0.1%, about 0.3%, about 0.4%, about 0.5%, about 0.6%, about 0.7%, about 0.8%, about about 1%, about 1.1%, about 1.2%, about 1.3%, about 1.4%, about 1.5%, about 1.6%, about 1.7%, about 1.8%, about 1.9%, about 2.0%, about 2.1%, about 2.2%, about 2.3%, about 2.4%, about 2.5%, about 2.6%, about 2.7%, about 2.8%, about 2.9%, or about 3.0%.

In some embodiments, the electrophoresis buffer composition comprises a mixture of two or more detergents, wherein at least one of the detergents is a hydrophobic detergent, i.e., having an alkyl chain with at least 13 carbon atoms, e.g., $SC_{13}S$, $SC_{14}S$, $SC_{15}S$, $SC_{16}S$, $SC_{17}S$, or $SC_{18}S$. In some embodiments, the electrophoresis buffer composition comprises a mixture of SDS and a hydrophobic detergent, i.e., having an alkyl chain with at least 13 carbon atoms, e.g., $SC_{13}S$, $SC_{14}S$, $SC_{15}S$, $SC_{16}S$, $SC_{17}S$, or $SC_{18}S$. In other embodiments, the electrophoresis buffer composition comprises a mixture of two hydrophobic detergents, e.g., $SC_{13}S$ and $SC_{14}S$, $SC_{13}S$ and $SC_{15}S$, $SC_{13}S$ and $SC_{16}S$, $SC_{13}S$ and $SC_{17}S$, $SC_{13}S$ and $SC_{18}S$, $SC_{14}S$ and $SC_{15}S$, $SC_{14}S$ and $SC_{16}S$, $SC_{14}S$ and $SC_{17}S$, $SC_{14}S$ and $SC_{18}S$, $SC_{15}S$ and $SC_{16}S$, $SC_{15}S$ and $SC_{17}S$, $SC_{15}S$ and $SC_{18}S$, $SC_{16}S$ and $SC_{17}S$, $SC_{16}S$ and $SC_{18}S$, or $SC_{17}S$ and $SC_{18}S$.

In some embodiments, determination of the types of detergent useful for an electrophoresis can be based on a molecular weight of the protein of interest. In some embodiments, a protein of interest that can be separated by a mixture of SDS and a hydrophobic detergent, i.e., having an alkyl chain with at least 13 carbon atoms, e.g., $SC_{13}S$, $SC_{14}S$, $SC_{15}S$, $SC_{16}S$, $SC_{17}S$, or $SC_{18}S$, has a molecular weight of less than about 20 kDa, less than about 19 kDa, less than about 18 kDa, less than about 17 kDa, less than about 16 kDa, less than about 15 kDa, less than about 14 kDa, less than about 13 kDa, less than about 12 kDa, less than about 11 kDa, or less than about 10 kDa, e.g., 5 kD to 15 kD.

In other embodiments, a protein of interest that can be separated by a hydrophobic detergent, i.e., having an alkyl chain with at least 13 carbon atoms, e.g., $SC_{13}S$, $SC_{14}S$, $SC_{15}S$, $SC_{16}S$, $SC_{17}S$, or $SC_{18}S$, has a molecular weight of higher than about 20 kDa, higher than about 30 kDa, higher than about 40 kDa, higher than about 50 kDa, higher than about 60 kDa, higher than about 70 kDa, higher than about 80 kDa, higher than about 90 kDa, higher than about 100 kDa, higher than about 110 kDa, higher than about 120 kDa, higher than about 130 kDa, higher than about 140 kDa, higher than about 150 kDa, higher than about 160 kDa, higher than about 170 kDa, higher than about 180 kDa, higher than 190 kD, or higher than about 200 kDa.

In some embodiments, the composition further comprises one or more additional components selected from a group consisting of a buffering component, an organic additive, a hydrophilic polymer, a metal chelator, and any combination thereof.

Examples of biological buffers that can be useful include, but are not limited to, bis-TRIS (2-bis[2-hydroxyethyl] amino-2-hydroxymethyl-1,3-propanediol), ADA (N-[2-acetamido]-2-iminodiacetic acid), ACES (2-[2-acetamino[-2-aminoethanesulphonic acid), PIPES (1,4-piperazinediethanesulphonic acid), MOPSO (3-[N-morpholino]-2-hydroxypropanesulphonic acid), bis-TRIS PROPANE (1,3-bis[tris(hydroxymethyl)methylaminopropane]), BES (N,N-bis[2-hydroxyethyl]-2-aminoethanesulphonic acid), MOPS (3[N-morpholino]propanesulphonic acid), TES (2-[2-[hydroxy-1,1-bis(hydroxymethyl)ethylamino]ethanesulphonic acid), HEPES (N-[2-hydroxyethyl] piperazine-N'-(2-ethanesulphonic)acid), DIPSO (3-N,N-bis [2-hydroxyethyl]amino-2-hydroxypropanesulphonic acid), MOBS (4-N-morpholinobutanesulphouic acid), TAPSO (3 [N-tri s-hydroxymethyl-methylamino]-2-hydroxypropanesulphonic acid), TRIS (2-amino-2-[hydroxymethyl]-1,3-propanediol), HEPPSO (N-[2-hydroxyethyl]piperazine-N'-[2-hydroxypropanesulphonic]acid), POPSO (piperazie-N, N'-bis[2-hydroxypropanesulphonic]acid), TEA (triethanolamine), EPPS (or HEPPS) (N-[2-hydroxyethyl]-piperazine-N'-[3-propanesulphonic]acid), TRICINE (N-tris [hydroxymethyl]methylglycine), GLY-GLY (diglycine), BICINE (N,N-bis[2-hydroxyethyl]glycine), HEPBS (N-[2-hydroxyethyl]piperazine-N'-[4-butanesulphonic]acid), TAPS (N-tris[hydroxymethyl]methyl-3-aminopropanesulphonic acid), AMPD (2-amino-2-methyl-1,3-propanediol), TABS (N-tris[hydroxymethyl]methyl-4-aminobutanesulphonic acid), AMPSO (3-[(1,1-dimethyl-2-hydroxyethyl)amino]-2-hydroxypropanesulphonic acid), CHES (2-(N-cyclohexylamino)ethanesulphonic acid), CAPSO (3-[cyclohexylamino]-2-hydroxy-1-propanesulphonic acid), AMP (2-amino-2-methyl-1-propanol), CAPS (3-cyclohexyl amino-1-propanesulphonic acid), CAB S (4-[cyclohexylamino]-1-butanesulphonic acid), or any combination thereof. In other embodiments, the buffering component comprises a TRIS buffer, a phosphate buffer, a citrate buffer, or any combination thereof.

In other embodiments, the electrophoresis buffer composition comprises one or more organic additives. In some embodiments, the organic additives comprises mannitol, glycerol, ethylene glycol, ethanol, methanol, or any combination thereof. In some embodiments, the one or more organic additives include Non-limiting examples of alternative solvents include ethylene glycol, propylene glycol, monomethyl ether of diethylene glycol, dimethyl ether of diethylene glycol, methyl carbitol, tetrahydrofuran, dibutyl ether, dimethylformamide, sulfolane or alcohols having 1-4 carbon atoms.

In certain embodiments, the electrophoresis buffer composition comprises one or more polymers. In some embodiments, the polymers are hydrophilic polymers. In other embodiments, the polymers are hydrophobic polymers. In some embodiments, the hydrophilic polymer comprises dextran, polyacrylamide, polyethylene glycol, polyvinylpyrrolidone, polyvinyl alcohol, or any combination thereof.

In other embodiments, the electrophoresis buffer composition further comprise a metal chelator, i.e., a molecule that is capable of sequestering metal ions such as $Ca^{2+}$ and $Fe^{3+}$. In some embodiments, the metal chelator comprises ethylenediaminetetraacetic acid (EDTA), diethylenetriaminepentaacetic acid, or any combination thereof. After being bound by a metal chelator, e.g., EDTA, metal ions remain in solution but exhibit diminished reactivity. Other chelating agents can include ethylene glycol tetraacetic acid (EGTA), trisodium nitrilotriacetate, hydroxyethyl ethylenediamine trisodium acetate (trisodium HEDTA), diethylene triamino pentasodium acetate or uramil disodium acetate.

The ranges of concentration over which a metal chelator, e.g., EDTA, can be used for the preparation of an electrophoresis buffer composition according to the present disclosure are from about 0.5% or less, or from about 0.4% or less, or from about 0.3% or less, or from about 0.2% or less, or from about 0.1% or less, or from about 0.05% or less, or from about 0.03% to about 0.5%, or from about 0.05% to about 0.5% or from about 0.1% to about 0.5%, or from about 0.2% to about 0.5%, or from about 0.3% to about 0.5%, or from about 0.4% to about 0.5%, or from about 0.03% to about 0.4%, or from about 0.05% to about 0.4% or from about 0.1% to about 0.4%, or from about 0.2% to about 0.4%, or from about 0.3% to about 0.4%, or from about 0.03% to about 0.3%, or from about 0.05% to about 0.3% or from about 0.1% to about 0.3%, or from about 0.2% to about 0.3%, or from about 0.03% to about 0.5%, or from about 0.05% to about 0.2% or from about 0.1% to about 0.2%, or from about 0.03% to about 0.1%, or from about 0.05% to about 0.1%, or from about 0.03% to about 0.05%. Preferably, from about 0.05% or less, and most preferably, at 0.03%.

In some embodiments, the electrophoresis buffer composition as described herein can be added to a sample buffer, a running buffer, and/or a gel for a capillary gel electrophoresis.

In some embodiments, the electrophoresis buffer composition has a pH higher than about 6.0, about 6.5, about 7.0, about 7.5, about 8.0, about 8.5, about 9.0, about 9.5, or about 10.0. In other embodiments, the electrophoresis buffer composition has a pH between about 6.0 and about 11.0, between about 6.5 and about 11.0, between about 7.0 and about 10.5, between about 7.0 and about 10.0, between about 7.0 and about 9.5, between about 7.0 and about 9.0, between about 7.0 and about 8.5, between about 7.0 and about 8.0, or between about 7.0 and about 7.5. In other embodiments, the electrophoresis buffer composition has a pH of about 6.5, about 7.0, about 7.2, about 7.4, about 7.6, about 7.8, about 8.0, about 8.2, about 8.4, about 8.6, about 8.8, about 9.0, about 9.2, about 9.4, about 9.6, about 9.8, about 10.0, about 10.5, about 11.0, or about 11.5.

In some embodiments, the electrophoresis buffer composition has a pH higher than about 5.0, about 5.5, about 6.0, about 6.5, about 7.0, about 7.5, about 8.0, about 8.5, about 9.0, about 9.5, or about 10.0. In some embodiments, the electrophoresis buffer composition has a pH higher than about 5.0, about 5.1, about 5.2, about 5.3, about 5.4, about 5.5, about 5.6, about 5.7, or about 5.8. about 5.9, about 6.0, about 6.1, about 6.2, about 6.3, about 6.4, about 6.5, about 6.6, about 6.7, or about 6.8. about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, or about 9.8. about 9.9, or about 10.0. In some embodiments, the electrophoresis buffer composition has a pH of about 5.0, about 5.1, about 5.2, about 5.3, about 5.4, about 5.5, about 5.6, about 5.7, or about 5.8. about 5.9, about 6.0, about 6.1, about 6.2, about 6.3, about 6.4, about 6.5, about 6.6, about 6.7, or about 6.8. about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8. about 9.9, or about 10.0.

III. Methods of Separating Proteins

The present disclosure is directed to a method for separating a protein of interest via electrophoresis comprising denaturing the protein of interest in a sample buffer comprising the electrophoresis buffer composition described herein. In some embodiments, the electrophoresis is a capillary gel electrophoresis.

Capillary electrophoresis (CE) is a family of electrokinetic separation methods performed in submillimeter diameter capillaries and in micro- and nanofluidic channels. CE can include capillary zone electrophoresis (CZE), but other electrophoretic techniques including capillary gel electrophoresis (CGE), capillary isoelectric focusing (CLEF), capillary isotachophoresis and micellar electrokinetic chromatography (MEKC). In CE methods, analytes including a protein of interest migrate through electrolyte solutions under the influence of an electric field. Analytes can be separated according to ionic mobility and/or partitioning into an alternate phase via non-covalent interactions. Additionally, analytes may be concentrated or "focused" by means of gradients in conductivity and pH.

In some embodiments, the method further comprises running an electrophoresis gel in a running buffer. In some embodiments, the running buffer and/or gel comprises the electrophoresis buffer composition described herein.

The present disclosure also include a method for improving peak separation efficiency of a protein of interest via electrophoresis comprising denaturing the protein of interest in a sample buffer comprising the electrophoresis buffer composition described herein and running an electrophoresis gel in a running buffer. In some embodiments, the protein peak separation efficiency (PSE) is improved as compared to the protein peak separation efficiency (PSE) of a separation conducted using sodium dodecyl sulfate (SDS). In some embodiments, the electrophoresis gel results show less artificial high molecular weight species compared to an electrophoresis gel conducted with SDS.

In some embodiments, the denaturing can be performed at a temperature of at least about 60° C., at least about 65° C., at least about 70° C., at least about 75° C., or at least about 80° C., e.g., at a temperature between about 60° C. and about 70° C., between about 65° C. and about 70° C., or about 60° C. and about 65° C. In other embodiments, the denaturing is performed for at least about 3 minutes, at least about 4 minutes, at least about 5 minutes, at least about 6 minutes, at least about 7 minutes, at least about 8 minutes, at least about 9 minutes, or at least about 10 minutes.

The methods of the present disclosure can further comprise detecting the protein of interest after the separation. The systems for the detection can be UV or UV-Vis absorbance as their primary mode of detection. In these systems, a section of the capillary itself can be used as the detection cell. The use of on-tube detection can enable detection of separated analytes with no loss of resolution.

Fluorescence detection can also be used in capillary electrophoresis for samples that naturally fluoresce or are chemically modified to contain fluorescent tags. This mode of detection offers high sensitivity and improved selectivity for these samples, but cannot be utilized for samples that do not fluoresce. Numerous labeling strategies are used to create fluorescent derivatives or conjugates of non-fluorescent molecules, including proteins and DNA.

In order to obtain the identity of sample components, capillary electrophoresis can be directly coupled with mass spectrometers or Surface Enhanced Raman Spectroscopy (SERS). In most systems, the capillary outlet is introduced into an ion source that utilizes electrospray ionization (ESI). The resulting ions are then analyzed by the mass spectrometer. This set-up requires volatile buffer solutions, which will affect the range of separation modes that can be employed and the degree of resolution that can be achieved. The measurement and analysis are mostly done with a specialized gel analysis software.

For CE-SERS, capillary electrophoresis eluants can be deposited onto a SERS-active substrate. Analyte retention times can be translated into spatial distance by moving the SERS-active substrate at a constant rate during capillary electrophoresis. This allows the subsequent spectroscopic technique to be applied to specific eluants for identification with high sensitivity. SERS-active substrates can be chosen that do not interfere with the spectrum of the analytes.

In some embodiments, the protein of interest in the analytes or in the sample buffer is a naturally occurring protein that is to be isolated or a recombinantly prepared protein. In other embodiments, the protein of interest can be an enzyme, a hormone, a cytokine, a cell surface receptor, a protease, a cytokine receptor, or any combination thereof. In other embodiments, the protein of interest is an antibody.

In some embodiments, the antibody is an isotype selected from IgM, IgA, IgE, IgD, and IgG. In other embodiments, the IgG antibody is selected from IgG1, IgG2, IgG3, and IgG4.

In other embodiments, the protein of interest is a fusion protein. In some embodiments, the fusion protein comprises an enzyme, a hormone, a cytokine, a cell surface receptor, a protease, a cytokine receptor, or any combination thereof. In other embodiments, the fusion protein is fused to a heterologous moiety. In some embodiments, the heterologous moiety is a half-life extending moiety. In other embodiments, the half-life extending moiety comprises an Fc.

In some embodiments, the protein of interest to be analyzed by the present methods has a molecular weight higher than about 5 kD, about 10 kD, about 15 kD, about kD, about 25 kD, about 30 kD, about 35 kD, about 40 kD, about 50 kD, about 60 kD, about 70 kD, about 80 kD, about 90 kD, about 100 kD, about 110 kD, about 120 kD, about 130 kD, about 140 kD, about 150 kD, about 160 kD, about 170 kD, about 180 kD, about 190 kD, or about 200 kD. In certain embodiments, the protein of interest has a molecular weight higher than about 15 kD. In other embodiments, the protein of interest has a molecular weight between about 15 kD and about 200 kD, about 20 kD and about 200 kD, about 30 kD and about 200 kD, about 40 kD and about 200 kD, about 50 kD and about 200 kD, about 30 kD and about 150 kD, about 40 kD and about 150 kD, about 50 kD and about 150 kD.

The present disclosure is further illustrated by the following examples which should not be construed as further limiting. The contents of all references cited throughout this application are expressly incorporated herein by reference.

EXAMPLES

The following Examples set forth specific aspects of the invention to illustrate the invention and provide a description of the present methods for those of skill in the art. The Examples should not be construed as limiting the invention, as the Examples merely provide specific methodology and exemplification that are useful in the understanding and practice of the invention and its various aspects.

Example 1

The Inventors discovered that for proteins with poor PSE by CE-SDS, an increase in detergent hydrophobicity can improve PSE by increasing the affinity of the detergent to the protein. FIG. 1 shows overlay electropherograms of Recombinant Therapeutic Protein-1 (RTP-1) run under typical CE-SDS conditions and with gel matrix containing sodium hexadecyl sulfate (SHS). The presence of SHS led to a discernible improvement in PSE, resulting in baseline separation of the main protein peak from a prominent impurity peak (Impurity Peak 1, or $IP_1$, FIG. 1). The improved peak shape and resolution extended the working range for the assay, including detection and quantification limits. In particular, assay sensitivity increased 3-4 fold as the sample load could be increased without compromising linearity (FIG. 2).

The detergents evaluated contained the same charged sulfate head group and sodium counter-ion, only varying in alkyl chain length. To directly attribute alkyl chain length to potential improvements in RTP-1 PSE, initial experiments included only the detergent of interest in both the running gel buffer and sample solutions. As shown in FIG. 3, PSE significantly improved with longer alkyl chain length, with SHS improving plate count over SDS by 8-fold (11820/

1450, FIG. 4) and resolution between the main peak and the impurity $IP_1$ by 2.3-fold (1.8/0.8, FIG. 4). SUS marginally improved PSE compared to SDS, a phenomenon observed previously with the slightly smaller sodium decyl sulfate (17) and was attributed to the ability of detergents with smaller alkyl chains to more uniformly coat elongated proteins (albeit with lower affinity). Interestingly, these authors also found that STS and SHS reduced PSE of their model proteins by PAGE (17). One explanation is that RTP-1 is not represented by these model proteins, as may be the case given its properties (discussed below).

The CGE resolving power by longer chain detergents was not simply dependent on concentration since SDS could not achieve the same level of PSE as SHS regardless of concentration (FIG. 4).

The Correlation Between Longer Hydrocarbon Chain Detergents and the Improved Resolution of RTP-1. Hypothetically, more stable detergent:protein complexes should result in higher separation efficiencies because the structure would be more homogeneous (17). Based on specific physical properties of RTP-1, SDS may be insufficient to stabilize a uniformly denatured RTP-1 complex and instead may require a more hydrophobic detergent. One of the two domains of RTP-1, designated as "Domain 2", is thermophilic, a property that suggests its overall structure is rigid (18) and contains a relatively hydrophobic core(19). Under native or denaturing conditions (with or without SDS), thermophilic proteins are often required to overcome higher transition-state energy barriers towards denaturation compared to typical proteins(18,20). Modeling studies show that one face of Domain 2 has a high proportion of negative charge potential which would cause electrostatic repulsion of a detergent sulfate group. This repulsion may require the more hydrophobic tail of SHS to establish an overall energetically-favorable interaction with the hydrophobic core of the protein to initiate unfolding (FIG. 5).

Differential Scanning calorimetry (DSC) was used to quantify the energy requirements of SHS and SDS to fully denature RTP-1 (21). Endotherm profiles of detergent: RTP-1 complexes were biphasic, represented as peaks $E_1$ and $E_2$ in FIGS. 6A and 6B. $E_1$ and $E_2$ are attributed to RTP-1 domains 1 and 2 respectively (data not shown). Thermodynamic data are summarized in Table 1.

TABLE 1

RTP-1 Peak Separation Efficiency (PSE) Values Obtained Using Various Gel Buffer Detergents

| Detergent in the Gel Buffer Solution (0.2%)[a] | Resolution Between Main and $IP_1$ | Main Peak Theoretical Plates |
|---|---|---|
| SUS (C11) | 1.18 | 2530.0 |
| SDS (C12) | 0.77 | 1825.7 |
| STS (C14) | 1.63 | 6083.5 |
| SHS (C16) | 1.80 | 11815.9 |

[a]The RTP-1 sample solution contained the corresponding detergent.

The observed enthalpy changes during thermal denaturation of domain 1, represented by the $E_1$ peak, are comparable for both detergents (FIG. 6C).

TABLE 2

DSC functions obtained from adding various concentrations of either SDS or SHS to RTP-1

| Detergent | [Detergent], mM | $Tm_1$ (° C.)[a] | $Tm_2$ (° C.)[b] | $E_1, \Delta H_1$ (cal/mol)[c] | $E_2, \Delta H_2$ (cal/mol)[d] |
|---|---|---|---|---|---|
| SDS | 0.000 | 68.9 | 77.1 | 320007 | 167537 |
|  | 0.050 | 68.9 | 77.1 | 334811 | 181004 |
|  | 0.100 | 69.1 | 77.1 | 386738 | 202590 |
|  | 1.000 | 63.9 | 77.1 | 128843 | 216686 |
|  | 8.000 | 50.4 | 74.7 | 52795 | 115906 |
| SHS | 0.000 | 68.9 | 77.1 | 320007 | 167537 |
|  | 0.003 | 68.8 | 77.0 | 320007 | 187639 |
|  | 0.013 | 66.7 | 77.1 | 200544 | 217545 |
|  | 0.500 | 60.6 | 77.2 | 44562 | 117457 |
|  | 2.000 | 58.7 | 72.4 | 24341 | 87447 |

[a, b]Comparable drop in Tm with [detergent] regardless of detergent type
[c]Comparable drop in $\Delta H_1$ with [detergent] regardless of detergent type (FIG. 6C)
[d]$\Delta H_2$ dropped more dramatically with SHS after reaching a particular concentration (0.1 mM SDS and 0.013 mM SHS) (FIG. 6D)

However, the thermal denaturation profiles of the thermophilic Domain 2, or $E_2$, were different depending on the detergent as shown in FIG. 6D. Less energy was required for SHS to denature this domain, specifically in the range of expected critical micellar concentrations (CMCs), which would be less than 8 mM for SDS and less than 2 mM for SHS (22) and suggests that the SHS:RTP-1 complex is more stable with SHS bound.

Other Proteins Better Resolved Using SHS. The correlation between increased CGE resolving power using SHS and protein hydrophobicity held for some other proteins. FIG. 7A shows the substantially improved CGE profile of a second protein, RTP-2, using the SHS gel buffer compared to SDS. RTP-2 is a mAb with a high proportion of hydrophobic patches on its surface as determined by its Spatial Aggregation Propensity (SAP) score (26). In contrast, RTP-3 (FIG. 7B), a relatively hydrophilic mAb with an SAP score much lower than RTP-2, yielded high PSE regardless of the detergent present in the gel buffer (SDS or SHS).

Development of an SHS-Containing Gel Buffer and Qualification of a CE-SHS Purity Method for Product Release. The SHS gel buffer composition was developed to be robust, reproducible and stable, with an expiry of ≥15 months. The final RTP-1 purity method was successfully qualified with a nominal protein load 3-4 fold higher than otherwise obtained under fully optimized CE-SDS conditions (FIG. 2).

Materials and Methods

Reagents. Glycerol (≥99%), Ethylenediaminetetraacetic acid (EDTA, ≥99%) dextran (MW~2000 kDa), Tris(hydroxymethyl)aminomethane (Trizma, ≥99.9%), Boric acid (≥99.5%), and β-mercaptoethanol (≥99%) were purchased from Sigma (St. Louis, MO). Powders of sodium undecyl sulfate (SUS, ≥99%), sodium tetradecyl sulfate (STS, >95%), and sodium hexadecyl sulfate (SHS, >98%) were purchased from Alfa Aesar (Wood Hill, MA). Powdered sodium dodecyl sulfate (SDS, >99%) was purchased from Avantor (Center Valley, PA). For CGE assay applications, 10 kDa internal standard (I. S.), N acid/base wash solutions, SDS-MW gel and SDS-sample buffers, pre-assembled bare-fused silica capillary cartridges, and 2 mL universal vials and caps were purchased from AB Sciex (Framingham, MA).

Sample Preparation. Unless stated otherwise, RTP-1 was prepared at 0.9 mg/mL with 0.76% SDS, 5% β-mercaptoethanol and 76 mM Tris-HCl. 500 mM Tris-HCl pH 9.0 was prepared using a Schott pH meter equipped with an SI Analytics probe then deionized water and detergent powder added to reach the desired concentrations. For relatively hydrophobic detergents, dissolving the powders into the Tris-HCl buffer required a combination of sonication and heating in a 70° water bath.

Preparation of Gel Buffer Solutions. Gel buffers were prepared as follows: Trizma base, boric acid, EDTA, and glycerol were mixed together and filtered through a micron filter. Detergent(s) and dextran were added subsequently. Once all components were in solution, the liquid was slowly poured into appropriately sized PTFE bottles purchased from Thermo Scientific (Waltham, MA) and stored at room temperature.

Capillary Electrophoresis. CGE experiments were performed on a PA800+ instrument equipped with a photodiode array detector and 32 Karat acquisition software (Version 9) (AB Sciex, Framingham, MA). Electrophoretic separations occurred in 50 μm internal diameter pre-cut capillaries at 15 kV constant voltage with detection positioned 20 cm from the point of sample injection. Data from 32 karat was transferred to Empower 3 (Build 3471, Waters, Milford, MA) for data processing. Note that Empower is a chromatography-based software, thus migration times were converted to retention times and calculated as such when assessing PSE, see Equations (1) and (2) below.

Assessment of Peak Separation Efficiency (PSE). PSE was evaluated using the following equations for plate count (Equation (1)) and resolution (Equation (2)) (United States Pharmacopeia, Chapter 621). Empower calculates these values automatically as field options.

$$N = 16(R_t/W)^2 \quad (1)$$

Where N=the number of theoretical plates (plate count), $R_t$ is the retention/migration time of the peak, and W the peak width at baseline with tangents drawn to 61% of peak height.

$$R = 2(R_{t2} - R_{t1})/(W_2 + W_1) \quad (2)$$

Where R=the resolution between two peaks, $R_{t1}$ and $R_{t2}$ the retention/migration times of peaks 1 and 2 respectively, and $W_2 + W_1$ the sum of peak widths at baseline with tangent lines drawn at 50% peak height.

Differential Scanning calorimetry. RTP-1 was diluted with 1×PBS (150 mM NaCl and 20 mM phosphate pH 7.2) to 0.5 mg/mL with various amounts of SDS or SHS. Measurements were performed on a Malvern MicroCal VP-DSC system (Malvern Instruments, Northampton, MA) with a cell volume of approximately 0.5 mL. Temperature scans were conducted from 20 to 95° C. at a scan rate of 1° C./min. A buffer reference scan was subtracted from each sample scan prior to concentration normalization. Baselines were created in Origin 7.0 (Origin Lab, Northampton, MA) by cubic interpolation of the pre- and post-transition baselines.

Protein Modeling. The amino acid sequences of one of the two domains (domain 2) of RTP-1 was aligned to a similar domain with known structure as the template. The 3D structures of the domain were built using the homology modeling tool MODELLER (15). The homology models were subjected to side chain optimization and minimization steps and followed by model validation. The surface charge of the domain was calculated according to the charge of residues and the accessibility of the residue in the Propka output file using Adaptive Poisson-Boltzmann Solver (16). Finally, the electrostatic map was visualized by the program PyMOL (Schrödinger, LLC).

Example 2

Recombinant IgG1 proteins mAb-1, mAb-2 and mAb-3 were manufactured using Chinese hamster ovarian cells. Proteins were thawed from −80° C. before use. Glycerol (≥99%), Ethylenediaminetetraacetic acid (EDTA, ≥99%), Dextran (MW~2000 kDa), Tris(hydroxymethyl)aminomethane (Trizma, ≥99.9%), 1M Tris(hydroxymethyl)aminomethane hydrochloride solution (BioPerformance Certified), Boric acid (≥99.5%), β-mercaptoethanol (BME, ≥99%), Iodoacetamide (IAM, ≥99%) and powdered sodium decyl sulfate ($SC_{10}S$, ≥99%,) were purchased from Sigma-Aldrich (St. Louis, MO). Powdered sodium hexadecyl sulfate (SHS, >98%) and sodium 1-tetradecyl sulfate (STS, >95%) were purchased from Alfa Aesar (Wood Hill, MA) and powdered sodium dodecyl sulfate (SDS, >99%) was purchased from Avantor (Center Valley, PA). For CGE applications, 10 kDa internal standard (I.S.), 0.1 N acid/base wash solutions, pre-assembled bare-fused silica capillary cartridges, and 2 mL universal vials and caps were purchased from AB Sciex (Framingham, MA).

Sample Buffer and Gel Buffer Preparation

For CE-SDS applications, SDS-MW gel buffer and SDS-MW sample buffer (100 mM Tris-HCl, 1% w/v SDS, pH 9.0) were purchased from AB Sciex (Framingham, MA). Trizma base, boric acid, EDTA, and glycerol were mixed together and filtered through a 0.2 μm filter. Detergents and dextran were added subsequently. Once all components were in solution, the liquid was slowly poured into appropriated sized PTEE bottles purchased from Thermo Scientific (Waltham, MA). The sample buffer containing alternative detergents were prepared as follows: 1M Tris-HCl solutions at certain pH values were diluted to appropriate concentrations and further mixed with detergents to make homogenous solutions.

Sample buffers with the following components were prepared: $SC_{16}S$ (SHS)-containing sample buffer (50 mM Tris-HCl, 0.2% w/v SHS, pH 8.0); $SC_{14}S$ (STS)-containing sample buffer (50 mM Tris-HCl, 0.5% w/v STS, pH 8.0); and $SC_{10}S$-containing sample buffer (50 mM mM Tris-HCl, 2% w/v $SC_{10}S$, pH 9.0)

Sample Preparation Under Non-Reducing and Reducing Conditions

For CGE applications under non-reducing conditions, mAb samples were prepared with a final protein concentration of 0.9 mg/mL and 30 mM IAM using SDS sample buffer (100 mM Tris-HCl, 1% w/v SDS, pH 9.0, AB Sciex). For CGE applications under reducing conditions, mAb samples were prepared with a final protein concentration of 0.9 mg/mL and 5% v/v BME using different sample buffer conditions including SDS-MW sample buffer, SHS-containing sample buffer (0.2% w/v SHS), STS-containing sample buffer (0.5% w/v SHS), and $SC_{10}S$-containing sample buffer (2% w/v, $SC_{10}S$). Unless other stated, sample denaturation under non-reducing conditions and reducing conditions was conducted at 70° C. for 5 min and 70° C. for 10 min, respectively.

Capillary Gel Electrophoresis Method

CGE experiments were performed on a PA800+ instrument equipped with a UV detector and 32 Karat acquisition software (Version 9) (AB Sciex, Framingham, MA). Electrophoretic separations occurred in 50 μm internal diameter pre-cut capillaries at 15 kV constant voltage with detection positioned 20 cm from the point of sample injection. Data from 32 karat was transferred to Empower 3 (Build 3471, Waters, Milford, MA) for data processing.

Due to similarity in structure and size of IgG molecules, which are the main class of mAbs, generic CE-SDS methods in which SDS is applied in both sample buffer and sieving gel buffer are usually suitable for analysis of a broad range of IgG molecules. Under reducing condition, the IgG molecule is treated with a reducing reagent, such as β-mercaptoethanol (BME), to cleave di-sulfide bonds. Protein fragments including light chain (LC), heavy chain (HC), and non-glycosylated heavy chain (NGHC) are separated by size and electrophoretic mobility.

Example 3 (Post-HC BMW Species and Confirmation of Artifacts)

FIG. 9 displays the electropherogram overlays of mAb-1 and m-Ab3 running under generic CE-SDS reducing conditions. These two reduced mAb molecules demonstrate comparable separation profiles in terms of major components but different patterns of minor species (labeled as A~D in FIG. 9B) at the post-HC high molecule weight region. Among these minor species, species A (highlighted by a red rectangle) is seen in the sample traces of mAb-1 and mAb-3. The migration time of peak A corresponds to a half-antibody fragment consisting of one heavy and one light chain (H:L). Species D (indicated by an arrow) is also found in both sample traces at noticeable levels, which has a molecular weight very close to a heavy-heavy fragment of antibody observed under non-reducing CE-SDS conditions (FIG. 9). Besides two common minor species, there are additional group B (compassed by a dashed rectangle) and peak C (partially co-migrating with peak D) species present at the post-HC region of mAb-1 sample trace, which are estimated to have molecular weights (MWs) within 75~100 kDa according to their migration positions relative to A and D species. Using the CE-SDS reducing conditions, the purity of mAb-1 was measured at 95.3% by including the sum of relative percentages of LC (31.2%) and HC (64.0%). The NGHC species was 0.6%, which was exclude from purity calculation. The total percentage of all post-HC HMW species of mAb-1 was determined at 3.0% with the group B species being approximately 2.0%.

Some HMW species observed at the post-HC region of mAb-1 electropherogram appeared to be artifacts induced under CE-SDS reducing conditions. Firstly, in CE-SDS analysis of mAb-1 under non-reducing conditions, the method reported much higher aggregate level (~2.5%) than native and denatured SEC measurements of and 0.4%, respectively. The AUC evaluation of this mAb molecule further confirmed SEC did not underestimate aggregate results, and the high HMW amount observed in CE-SDS analysis was actually the consequence of incomplete protein denaturation, very likely due to the deficiency of SDS to uniformly coating intact mAb-1 molecules. The same SDS sample buffer and SDS-based gel matrix are applied in both non-reducing and reducing CE-SDS analyses, thus incomplete denaturation may also occur to the reduced mAb-1 molecule fragments. Secondly, in order to examine if all post-HC HMW species are inherent product-related impurities, a study was conducted by running mAb-1 molecules under CE-SDS non-reducing, partially reducing and fully reducing conditions.

The electropherograms overlaid in FIG. 10 clearly demonstrated the post-HC group B species shown in the reduced mAb-1 sample trace was invisible in the profiles of its non-reduced and two partially-reduced samples. In contrast, the peak A species was seen in all four traces. This observation suggests group B species are very likely artifacts induced by incomplete denaturation of fully reduced mAb-1 fragments. Lastly, the total percentage of all post-HC HMW species of mAb-1 exhibited a strong relationship with the protein concentration. FIG. 11 displays the plots of measured % Purity and % Total HMW across the range of 25%-135% of nominal protein concentration (0.9 mg/mL). The trending lines of these two responses indicate the applied CE-SDS method did not reach sufficient and consistent sample denaturation under different protein concentration levels, and therefore more than 2.5% increase in the % Total HMW was observed at the high protein concentration (1.23 mg/mL) condition compared to the low concentration case (0.23 mg/mL), accompanying with a resulting decrease in the purity measurement. It was further found the variation of group B and peak C species made the major contribution for the changes in the % Total HMW while the relative percentages of A and D species maintained constant (data not shown). As a conclusion of these studies, the reduced CE-SDS method is not able to truly reflect the purity of mAb-1 molecules since the post-HC group B and C species are method induced artifacts rather than real product-related impurities. Thus, the applied CE-SDS method needs to be optimized so that unbiased purity assessment can be achieved.

Prior to identifying the final solution which can eliminate the formation of BMW artifacts, some parameters which usually demonstrate high impact on the protein denaturation were firstly evaluated, including the levels of SDS utilized in sample buffer and gel matrix and incubation conditions as well.

Example 4 (SDS Matrix Study)

Sample Buffer/Gel Matrix Preparation

Often, increasing the level of SDS of sample buffer working on the protein sample is the primary attempt to facilitate the completion of protein denaturation. A one factor at a time (OFAT) study by varying the SDS % of starting CE-SDS sample buffers from 0.5% to 4% was performed and the resulting electropherograms of reduced mAb-1 samples are overlaid in FIG. 12. The injection times of sample runs were adjusted accordingly to reach normalized peak area since the SDS % impacts sample loading efficiency. More group B HMW artifacts were observed in the reduced mAb-1 samples prepared by sample buffer containing higher SDS %, while the level of A species kept constant within the testing range. The overall increase in % Total BMW was roughly 1.5% (absolute value) as the SDS % of sample buffer varying from 0.5% to 4%. On the other hand, the impact of SDS % present in the sieving gel matrix was also investigated. FIG. 13 compares the electropherograms of reduced mAb-1 samples generated using 1% SDS sample buffer and separated by gel matrixes containing 0.2%-4% SDS. Similar to the trending observed in the OFAT study of SDS % of sample buffer, significant increase in group B BMW species were also noticed with the elevation of SDS % present in gel matrix. The results derived from the above two sets of experiments confirmed simple adjustment of the concentration of SDS in both sample and gel buffers could not mitigate BMW artifacts issues.

Incubation Conditions of Denaturation/Reduction

It is well known that sample incubation conditions such as temperature and time have significant impact on protein denaturation. Apparent BMW species are usually seen in the CE-SDS profiles of mAb samples denatured under gentle incubation conditions due to insufficient protein denaturation. In order to explore if modification of incubation conditions is helpful to suppress the formation artificial HMW species. The mAb-1 samples were denatured and reduced under a set of different incubation conditions ranging from 60° C., 5 min to 90° C., 15 min. Following that, the reduced mAb-1 samples were separated using vendor supplied SDS-based gel and the resulting electropherograms are demonstrated in FIG. 14A. More than 11% group B species was generated under the gentlest incubation conditions of 60° C., 5 min. The extension of incubation time to 10 min dramatically dropped the level of group B species to 3.5%, but further application of harsher incubation conditions did not significantly reduce its formation. For comparison, the mAb-3 molecule which demonstrates well behavior under typical CE-SDS conditions was also evaluated using similar incubation conditions and the resulting separation profiles are listed in FIG. 14B. It was found that HMW species having comparable MW as group B species seen in mAB-1 samples were also produced in mAb-3 sample under mild incubation conditions of 60° C., 3 min.

However, these HMW species gradually decreased to unnoticeable level as the incubation conditions reached to 70° C., 10 min, and did not reform under more harsh conditions, proving the completion of sample denaturation/reduction. The profile comparison between two mAb molecules under this incubation condition study offered one more level of confidence that the group B HMW species are virtually method induced artifacts. Unlike usual cases, the group B HMW artifacts observed in reduced mAb-1 molecules are resistant to SDS denaturation even at the harshest incubation conditions of 15 min, which may correlate to the low SDS affinity to the specific amino acid residues of this protein. However, further studies indicated the mAb-1 molecule could also be completed denatured under reducing conditions with all group B HMW artifacts being thoroughly eliminated at the typical incubation conditions suitable for majority of mAb molecules (e.g. 70° C., 10 min) through the application of relatively hydrophobic detergent, such as SHS or STS in both sample buffer and gel matrix.

Running with CE-SDS method, the on-board stability of reduced mAb-1 samples stored at 15° C. autosampler was also examined. FIG. 15 illustrates the separation profiles of reduced mAb-1 samples running at the beginning (T0), middle (T 10 hours) and end (T 20 hours) of a 24-injection sequence. Distinguishable difference in the profiles of the group B species was noticed from the earliest sample injection (T0) to the latest one (T These profile changes accompany with a 0.6% increase (absolute value) in the percent of group B species and a correspondent 0.6% decrease in % Purity, indicating an elevated on-board instability of mAb-1 molecule analyzing by the reduced CE-SDS method.

Minimizing Post-HC HMW Artifacts by Altering Detergents in Both Sample Buffer and Gel Matrix The regular CE-SDS method optimization strategies failed to offer help for sufficient denaturation of mAb-1 molecules under reducing conditions. Considering the benefit brought by application of SHS gel for the purity analysis of mAb-1 molecules with respect to the suppression of HMW artifacts under non-reducing conditions, a hypothesis was made that there might be possibility to address the post-HC HMW artifacts of reduced mAb-1 molecules by replacing the standard detergent SDS utilized in sample buffer and/or sieving gel matrix with more hydrophobic detergents.

To better understand the impact of detergent hydrophobicity on the denaturation and reduction of mab-1 molecules, the alternative detergents, sodium decyl sulfate ($SC_{10}S$) and sodium tetradecyl sulfate ($SC_{14}S$ or STS), were chosen as representative detergents for further method optimization. The detergents $SC_{10}S$ and $SC_{14}S$ (STS) possess the same sulfate head group but 2 less or 2 more alkyl carbon chain relative to the standard detergent SDS (also referred to $SC_{12}S$), and therefore demonstrate less or more hydrophobicity than SDS, respectively. Several reduced mAb-1 samples were prepared using sample buffers containing 2% (w/v) $SC_{10}S$, 1% (w/v) SDS or 0.5% (w/v) STS and then individually separated using two types of sieving gels including the SDS-based gel (supplied by AB Sciex) and our home-made SHS-based gel. The electropherograms of reduced mAb-1 samples generated under different sample buffer and gel matrix condition combinations of this study are compared in FIG. 16. Their resulting method responses with respect to the relative percentages of correct peak area of Purity, major component peaks and post-HC HMW species are summarized in Table 2.

TABLE 2

Peak Percentages of Reduced mAB-1 Sample Analysis

| Sieving matrix | Detergent in sample buffer | % LC | % HC | % NGHC | % Purity (% LC + % HC) | % Total post-HC HMW | % HMW artifacts |
|---|---|---|---|---|---|---|---|
| $SC_{12}S$ (SDS)-based gel | $SC_{10}S$ | 28.8 | 63.6 | 1.1 | 94.7 | 5.8 | 4.4 |
| | $SC_{12}S$ | 29.1 | 65.0 | 1.2 | 94.1 | 3.8 | 2.3 |
| | $SC_{14}S$ | 28.8 | 65.2 | 1.2 | 94.0 | 3.4 | 1.8 |
| $SC_{16}S$ (SHS)-based gel | $SC_{10}S$ | 28.7 | 66.0 | 1.2 | 94.7 | 3.4 | 1.9 |
| | $SC_{12}S$ | 28.8 | 66.8 | 1.3 | 95.7 | 2.4 | 0.9 |
| | $SC_{14}S$ | 29.3 | 67.2 | 1.3 | 96.5 | 1.6 | 0.0 |

By running reduced mAb-1 samples with SDS-based gel, the measured % HMW artifacts having more than 1-fold decrease, changed from 4.4% to 1.8% as the alkyl carbon chain length of sample buffer detergent increased from 10 to 14. This observation matches our expectation and could be attributed to the enhanced affinity of more hydrophobic detergent to the reduced mAb-1 fragments as evidenced by the reduced amount of group B species and their more centralized peak shape. In addition, elongation of the alkyl chain length of sample buffer detergent to 16 did not show further improvement, and the method was still compromised by underestimated purity results and insufficient robustness as well due to the presence of group B BMW species. The detergents with even longer chain lengths were not evaluated because of their limited solubility in aqueous solutions. On the other hand, similar relationship between the % BMW artifacts and the alkyl chain length of sample buffer detergent was also found when switching to SHS-based gel. More importantly, a dramatic improvement in the suppression of post-HC HMW artifacts was achieved by noticing a complete removal of group B species from the trace of reduced mAb-1 sample through the application of relative hydrophobic detergents in both sample buffer and gel matrix, which are STS and SHS in this case, respectively. Consequently, the purity result measured using this joint application was 96.5%, which was approximately 2.4% (absolute value) lower than the value acquired by the typical CE-SDS method. Moreover, through monitoring the levers of major peak components shown in Table 1, it is not hard to find the % LC and % NGHC are not evidently changed under different detergent situations. Therefore, the variation in % HC and % Purity could be majorly correlated to the changes of % HMW artifacts, leading to our conclusion that these post-HC HMW artifact are very likely to be un-fully denatured mAb-1 HC species.

Here, partial mitigation of BMW artifacts were observed in the scenarios where the relative hydrophobic detergent SHS or STS only existed in either sample buffer or gel matrix. These phenomena might be associated with the dynamic equilibrium between the detergent micelles attached to the protein/fragments and those existing in the gel matrix. Competitive dissociation and re-association of detergent micelles with different affinity from/to the existing detergent-analyte complex may occur when these species travel in a capillary at a typical separation temperature (e.g. 25° C.) within a certain time window (e.g. 30 min). In case of applying SDS-sample buffer and SHS-gel, the reduced mAB-1 molecules was not initially fully denatured due to the low affinity of SDS. And a further in-capillary sample denaturation may happen but not completely finish during separation through a gradual partially displacing of relative low affinity SDS micelles by more relative hydrophobic SHS micelles present in the gel matrix. Therefore, HMW artifacts were still detectable in this case at a level of 0.9%. Under the situation with reversed detergent applications (STS-sample buffer and SDS-gel), the better denatured mAb-1 fragments may still be subject to partial interchange of originally attached STS micelles with less hydrophobic SDS micelles existing in the gel although this process is less favorable in terms of protein affinity, making the HMW artifacts re-formed at a level of approximately 1.8%.

To expand the ranges of relative hydrophobic detergents which can used for this application, sample buffers containing 0.2% (w/v) SHS or mixtures of SHS and SDS at different combination levels were evaluated. As displayed in FIG. 17, in conjunction with SHS-based gel, the SHS-containing sample buffer demonstrated expected performance in removal of post-HC HMW artifacts since this detergent is even more hydrophobic than STS. In addition, the HMW artifacts started to reoccur upon the addition of 0.5% (w/v) SDS into the SHS sample buffer and further increased as the elevation of SDS level. This finding can be still attributed to competitive binding of SHS and SDS micelles to mAb-1 fragments even though the latter has lower affinity than the former. Besides this evaluation, another gel was also created by substitution of the original detergent SHS by STS with less hydrophobicity but still higher affinity than SDS to mAb-1. FIG. 18 illustrates comparable separation profiles of the same reduced mAb-1 sample running by SHS-based and STS-based sieving gels. In both cases, none of post-HC HMW artifacts were observed.

Application of Relative Hydrophobic Detergents in CGE Analysis of Other mAb Molecules The purity analysis of mAb-2 molecules under reducing conditions also require the existence of relative hydrophobic detergent in both sample buffer and sieving gel matrix so that unbiased purity results and improved separation performance can be achieved. In contrast, mAb-3 molecules yielded comparable CGE performance using the relative hydrophobic detergents or the standard detergent SDS employed in typical CE-SDS method.

Demonstrated in FIG. 19A, not only multiple atypical post-HC HMW species (group B and E) but also abnormally wide HC peak were observed in the profile of mAb-2 molecules under typical CE-SDS reducing conditions, strongly suggesting the needs to relative hydrophobic detergent for more adequate sample denaturation. Using the optimized method which has relative hydrophobic detergents STS and SHS in sample buffer and sieving gel, respectively, remarkable improvements in method performance as shown in FIG. 19B have been accomplished including removal of all atypical HMW species and enhancement in peak height and plate count of HC species by 3.5-fold and 6-fold, respectively.

It is to be appreciated that the Detailed Description section, and not the Summary and Abstract sections, is intended to be used to interpret the claims. The Summary and Abstract sections may set forth one or more but not all exemplary aspects of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A method for analyzing a protein sample, comprising separating a denatured protein of interest in the sample by capillary gel electrophoresis in a gel buffer composition comprising a hydrophobic detergent, wherein denaturing of the protein of interest is performed at a temperature of at least about 60° C., and wherein the hydrophobic detergent comprises a sulfate head group and a hydrophobic tail comprising an alkyl chain having greater than 14 carbon atoms.

2. A method for improving capillary gel electrophoresis protein peak separation efficiency (PSE), comprising separating a denatured protein of interest in a sample in a gel buffer composition comprising a hydrophobic detergent, wherein denaturing of the protein of interest is performed at a temperature of at least about 60° C., and wherein the hydrophobic detergent comprises a sulfate head group and a hydrophobic tail comprising an alkyl chain having greater than 14 carbon atoms.

3. A method for improving protein purity determination by capillary gel electrophoresis, comprising separating a denatured protein of interest in a sample in a gel buffer composition comprising a hydrophobic detergent, wherein denaturing of the protein of interest is performed at a temperature of at least about 60° C., and wherein the hydrophobic detergent comprises a sulfate head group and a hydrophobic tail comprising an alkyl chain having greater than 14 carbon atoms.

4. A method for separating a protein of interest via electrophoresis gel, comprising denaturing the protein of interest in a buffer composition comprising a hydrophobic detergent, wherein the denaturing is performed at a temperature of at least about 60° C., and wherein the hydrophobic detergent comprises a sulfate head group and a hydrophobic tail comprising an alkyl chain having greater than 14 carbon atoms.

5. The method of claim 4, which further comprises running the electrophoresis gel in a running buffer.

6. The method of claim 5, wherein the running buffer comprises a hydrophobic detergent, wherein the hydrophobic detergent comprises a sulfate head group and a hydrophobic tail comprising an alkyl chain having greater than 14 carbon atoms.

7. A method for improving peak separation efficiency of a protein of interest via electrophoresis gel, comprising: (i) denaturing the protein of interest in a buffer comprising a hydrophobic detergent, wherein the denaturing is performed at a temperature of at least about 60° C., and wherein the hydrophobic detergent comprises a sulfate head group and a hydrophobic tail comprising an alkyl chain having greater than 14 carbon atoms; and (ii) running an electrophoresis gel in a running buffer, wherein the protein peak separation efficiency (PSE) is improved as compared to the protein peak separation efficiency (PSE) of a separation conducted using sodium dodecyl sulfate (SDS).

8. The method of any one of claims 4 to 7, wherein the electrophoresis gel is capillary gel electrophoresis.

9. The method of any one of claims 1-3, 4, and 7, wherein the hydrophobic detergent comprises the same charged sulfate head group and sodium counter-ion with an alkyl chain length of 16.

10. The method of any one of claims 1-3, 4, and 7, wherein the alkyl chain has carbon atoms less than 19 or 20.

11. The method of claim 10, wherein the alkyl chain has carbon atoms of 15, 16, 17, or 18.

12. The method of any one of claims 1-3, 4, and 7, wherein the hydrophobic detergent is more hydrophobic than sodium dodecyl sulfate.

13. The method of any one of claims 1-3, 4, and 7, wherein the hydrophobic detergent is capable of inducing improved protein peak separation efficiency by capillary sieving electrophoresis compared to sodium dodecyl sulfate.

14. The method of any one of claims 1-3, 4, and 7, wherein the hydrophobic detergent is selected from a group consisting of sodium pentadecyl sulfate, sodium hexadecyl sulfate (SHS), sodium heptadecyl sulfate, and sodium octadecyl sulfate (SOS).

15. The method of claim 13, wherein the hydrophobic detergent is sodium hexadecyl sulfate (SHS).

16. The method of any one of claims 1-3, 4, and 7, wherein the hydrophobic detergent is at a concentration of from about 0.001% to about 4% w/v.

17. The method of any one of claims 1-3, 4, and 7, wherein the gel buffer composition further comprises one or more additional components selected from a group consisting of a buffering component, an organic additive, a hydrophilic polymer, a metal chelator, and any combination thereof.

18. The method of claim 17, wherein the buffering component comprises, a tris(hydroxymethyl)aminomethane buffer, a phosphate buffer, a citrate buffer, or any combination thereof.

19. The method of claim 17, wherein the organic additive comprises mannitol, glycerol, ethylene glycol, ethanol, methanol, or any combination thereof.

20. The method of claim 17, wherein the hydrophilic polymer comprises dextran, polyacrylamide, polyethylene glycol, or any combination thereof.

21. The method of claim 17, wherein the metal chelator comprises ethylenediaminetetraacetic acid, diethylenetriaminepentaacetic acid, or any combination thereof.

22. The method of any one of claims 1 to 3, and 4 to 7, wherein the electrophoresis gel results show less artificial high molecular weight species compared to an electrophoresis gel conducted with sodium dodecyl sulfate.

23. The method of any one of claims 1 to 3, 4, and 7, wherein the denaturing is performed at a temperature between about 60° C. and about 70° C.

24. The method of any one of claims 1 to 3, 4, and 7, wherein the denaturing is performed for at least about 3 minutes.

25. The method of any one of claims 1 to 3, 4, and 7, wherein the protein of interest is an antibody.

26. The method of claim 25, wherein the antibody is an isotype selected from IgM, IgA, IgE, IgD, and IgG.

27. The method of claim 26, wherein the IgG antibody is selected from IgG1, IgG2, IgG3, and IgG4.

28. The method of any one of claims 1 to 3, 4, and 7, wherein the protein of interest comprises an enzyme, a hormone, a cytokine, a cell surface receptor, a protease, a cytokine receptor, or any combination thereof.

29. The method of claim 28, wherein the protein of interest is a fusion protein.

30. The method of claim 29, wherein the fusion protein is fused to a heterologous moiety.

31. The method of claim 30, wherein the heterologous moiety is a half-life extending moiety.

32. The method of claim 31, wherein the half-life extending moiety comprises an Fc.

* * * * *